United States Patent [19]

Suzuki

[11] Patent Number: 4,981,773

[45] Date of Patent: Jan. 1, 1991

[54] METHOD FOR STABILIZATION OF ORGANIC BASE SUBSTANCES AGAINST LIGHT

[75] Inventor: Yoshiaki Suzuki, Kanagawa, Japan

[73] Assignee: Fuji Photo Film Co., Ltd., Kanagawa, Japan

[21] Appl. No.: 243,096

[22] Filed: Sep. 12, 1988

[30] Foreign Application Priority Data

Sep. 14, 1987 [JP] Japan ................................ 62-230595

[51] Int. Cl.$^5$ .......................... G03C 7/32; C07F 15/04

[52] U.S. Cl. .................................... 430/372; 430/551; 8/442; 8/623; 556/150

[58] Field of Search ................ 430/372, 551; 556/146, 556/150; 8/442, 623; 106/22; 252/587

[56] References Cited

U.S. PATENT DOCUMENTS

| | | | |
|---|---|---|---|
| 3,588,216 | 6/1971 | Bloom . | |
| 4,246,329 | 1/1981 | Hara et al. | 430/17 |
| 4,343,886 | 8/1982 | Nakamura et al. | 430/237 |
| 4,626,361 | 12/1986 | Molaire . | |
| 4,730,902 | 3/1988 | Suzuki et al. . | |
| 4,761,181 | 8/1988 | Suzuki | 106/22 |
| 4,763,966 | 8/1988 | Suzuki et al. . | |
| 4,767,571 | 8/1988 | Suzuki et al. . | |
| 4,791,023 | 12/1988 | Suzuki et al. . | |
| 4,851,322 | 7/1989 | Inagaki et al. . | |

OTHER PUBLICATIONS

Dance et al.: "Solvatochromic Dithiolene . . . ", J.C.S. Chem. Comm., 1973, p. 433.

Rehorek, "Nickel (II)-Chelate", Z. Chem., 1976, 16(11), 451-2.

*Primary Examiner*—Paul R. Michl
*Assistant Examiner*—Mark R. Buscher
*Attorney, Agent, or Firm*—Birch, Stewart, Kolasch & Birch

[57] ABSTRACT

The present invention relates to a method of stabilizing an organic base substance having an absorption mixture in the range of from about 300 nm to about 200 nm, against light, by combining the organic substance and at least one complex of formulae (I), (II) or (III):

(I)

(II)

(Abstract continued on next page.)

-continued (III)

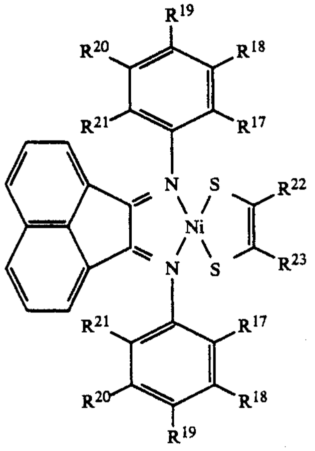

in which each of $R^1$ to $R^5$, $R^{10}$ to $R^{14}$ and $R^{17}$ to $R^{21}$, each of which may be the same or different within an individual compound, represents a halogen atom, a hydrogen atom, or an alkyl, aryl, cycloalkyl or heterocyclic group which is bonded to the carbon atom on the benzene ring directly or indirectly via a divalent linking group, and these may be same or different and the adjacent substituents may be bonded together to form a ring;

$R^6$ and $R^7$ each represents an alkyl group or an aryl group, and these may be the same or different;

$R^8$, $R^9$, $R^{15}$, $R^{16}$, $R^{22}$ and $R^{23}$ each represents a hydrogen atom, an alkyl group, an aryl group or a cyano group, and these may be same or different; and $R^8$ and $R^9$, $R^{15}$ and $R^{16}$, and $R^{22}$ and $R^{23}$ may be bonded together to form a ring.

The method is especially effective for stabilizing colors and dyes in color photographic materials, against light, without adversely affecting the hue and purity of the colors and dyes.

17 Claims, 1 Drawing Sheet

METHOD FOR STABILIZATION OF ORGANIC BASE SUBSTANCES AGAINST LIGHT

FIELD OF THE INVENTION

The present invention relates to a method for the stabilization of organic base substances against light and, more precisely, it relates to a method for the stabilization of organic compounds, especially organic dyes, organic colors or polymer compounds, against light.

BACKGROUND OF THE INVENTION

In general, it is well known that organic base substances are affected by light, for example organic dyes often fade or discolor. In the fields of formation of inks, dyeing of fibers and color photography, various studies have been performed toward inhibiting fading or discoloration of organic dyes, or that is, to improve the light-fastness or light-resistance of organic dyes. The present invention can be used extremely advantageously for the purpose of improving the light-fastness of the above-mentioned organic base substances.

The term "organic base substances or base compounds" as used herein includes substances which can visually be seen as colored or colorless by human eyes under irradiation of sun light; therefore, it includes not only substances having an absorption maximum in a visible range but also other substances, for example optical brightening agents or substances having a maximum absorption in an infrared range. In accordance with the present invention, the organic base substances include organic substances which have an absorption maximum in the range of from about 300 nm in an ultraviolet range to about 2000 nm in an infrared range.

The term "dyes or colors" as used herein includes organic substances which can be seen as colored by the naked eye under irradiation of sun light.

The term "light" as used herein means an electromagnetic wave having a wavelength of less than about 2000 nm, and it includes an ultraviolet ray of less than about 400 nm, a visible ray of from about 400 nm to about 700 nm, and a near infrared ray of from about 700 nm to about 2000 nm.

Hitherto, it has been known that such organic base substances, for example dyes or colors, are adversely affected by light, often fading or otherwise deteriorating. There are various reports relating to methods of lowering the color-fading or discoloration or methods of improving the light-fastness of colors and dyes. For instance, U.S. Pat. No. 3,432,300 discloses a method of blending therewith an organic compound, such as indophenol, indoaniline, azo or azomethine dyes, and a phenol type compound having a condensed heterocyclic structure, to thereby to improve the light-fastness of the dyes against light in the visible and ultraviolet ranges.

In general, in the field of silver halide photographic materials, azomethine dyes or indoaniline dyes are formed by the reaction of the oxidation product of an aromatic primary amine developing agent and a coupler, as described in C. E. K. Mees & T. H. James, *The Theory of the Photographic Process* (published by Macmillan, 1967), Chap. 17, and various means have been known for improving the stability against light of the color images formed from said dyes. For example, as stabilizers there are known the hydroquinone derivatives described in U.S. Pat. Nos. 2,360,290, 2,418,613, 2,675,314, 2,701,197, 2,704,713, 2,728,659, 2,732,300, 2,735,765, 2,710,801 and 2,816,028, and British Pat. No. 1,363,921; the gallic acid derivatives described in U.S. Pat. Nos. 3,457,079 and 3,069,262, and JP-B-43-13496 (the term "JP-B" as used herein means an "examined Japanese patent publication"); the p-alkoxyphenols described in U.S. Pat. Nos. 2,735,765 and 3,698,909; and the chroman and coumaran derivatives described in U.S. Pat. Nos. 3,432,300, 3,573,050, 3,574,627, 3,764,337, 3,574,626, 3,698,909 and 4,015,990.

However, although these compounds have an anti-fading or discoloration-preventing effect, the effect thereof as an anti-fading or discoloration-preventing agent is not sufficient.

British Pat. No. 1,451,000 mentions a method of improving the light-stability of organic base compounds by the use of azomethine quenchers having an absorption maximum in the range of a deeper color than the absorption maximum of the base compounds. However, since the azomethine quenchers themselves are strongly colored, this is disadvantageous because of having a noticeable influence on the hue of the base substances.

It has also been known from the past that polymer compounds, such as polyolefins, are deteriorated by light. In order to prevent such deterioration, an ultraviolet absorber, such as benzophenone derivatives as well as hindered amines, have heretofore mostly been used. However, although these absorbers were somewhat effective for reducing the deterioration of polymers by light, the effect thereof was not sufficient.

On the other hand, British Pat. No. 869,986, U.S. Pat. No. 4,050,938 and *Research Disclosure* No. 15162 (1976) disclose a method of stabilization of dyes with metal complexes. O. Cicchetti, *Adv. Polymer Sci.*, 7, 70 (1970}; M. S. Allen & J. F. Mckellar, *Chem. Soc. Rev.*, 4, 533 (1975); D. J. Carlson & D. M. Wiles, *J. Macromol. Sci. Rev. Macromol. Chem.*, C14, 65 (1976); R. B. Walter and J. F. Johnson, *J. Polymer Sci.*, 15, 29 (1980); and N. S. Allen, *Chem. Soc. Rev.*, 15, 373 (1986) mention the use of metal complexes for the prevention of light-deterioration of polymers. However, the discoloration-preventing effect or anti-fading effect itself of these compounds is not so high. In addition, the solubility thereof in organic solvents is not high; and, it is difficult to uniformly disperse them in polymers. Accordingly, it is impossible to add the complexes to polymers or dyes in an amount sufficient to display the discoloration-preventing effect or anti-fading effect thereof. Moreover, since the complexes themselves are noticeably colored, they adversely influence organic base substances, especially on the hue and purity of dyes, when added to base substances in a large amount.

SUMMARY OF THE INVENTION

One object of the present invention is to provide a method of improving the stability of organic base substances to light.

Another object of the present invention is to provide a method of improving the stability of organic base substances, especially colors or dyes, to light, without adversely affecting the hue and purity thereof.

Still another object of the present invention is to provide a method of improving the stability of organic base substances to light by the use of an organic base substance-stabilizing agent which has a high solubility in organic solvents and also has a high miscibility with organic base substances.

Still another object of the present invention is to provide a method of improving the stability to light of color photographic images.

Still another object of the present invention is to provide a method of improving the stability to light of dyes formed by the reaction of an aromatic primary amine developing agent and a color coupler.

Still another object of the present invention is to provide a method of improving the stability to light of colors or dyes as dispersed in various plastics by the use of a stabilizer which has a high miscibility with plastics.

In order to attain these objects, the present inventors have studied various matters and as a result have achieved the present invention.

Specifically, the objects of the present invention can be attained by incorporation of at least one compound of the following formulae (I), (II) and (III)into an organic base substance having an absorption maximum in the range of from about 300 nm to about 2,000 nm.

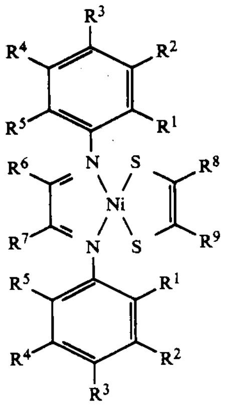

(I)

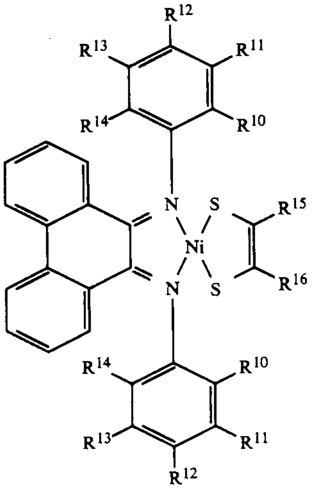

(II)

-continued

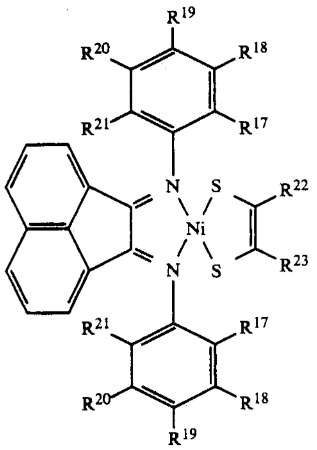

(III)

In the above formulae, each of $R^1$ to $R^5$, each of $R^{10}$ to $R^{14}$ and each of $R^{17}$ to $R^{21}$, each of which may be the same or different within an individual compound, represents a halogen atom, a hydrogen atom, or an alkyl, aryl, cycloalkyl or heterocyclic group as bonded directly or indirectly to the carbon atom on the benzene ring via a divalent linking group, and adjacent substituents of $R^1$ to $R^5$, $R^{10}$ to $R^{14}$ and $R^{17}$ to $R^{21}$ may be bonded together to form a ring;

$R^6$ and $R^7$ each represents an alkyl group or an aryl group, and these may be same or different;

$R^8$, $R^9$, $R^5$, $R^{16}$, $R^{22}$ and $R^{23}$ each represents a hydrogen atom, an alkyl group, an aryl group or a cyano group, and these may be same or different within an individual compound; and $R^8$ and $R^9$, $R^{15}$ and $R^{16}$, and $R^{22}$ and $R^{23}$ may be bonded together to form a ring.

DETAILED DESCRIPTION OF THE INVENTION

Figure 1:
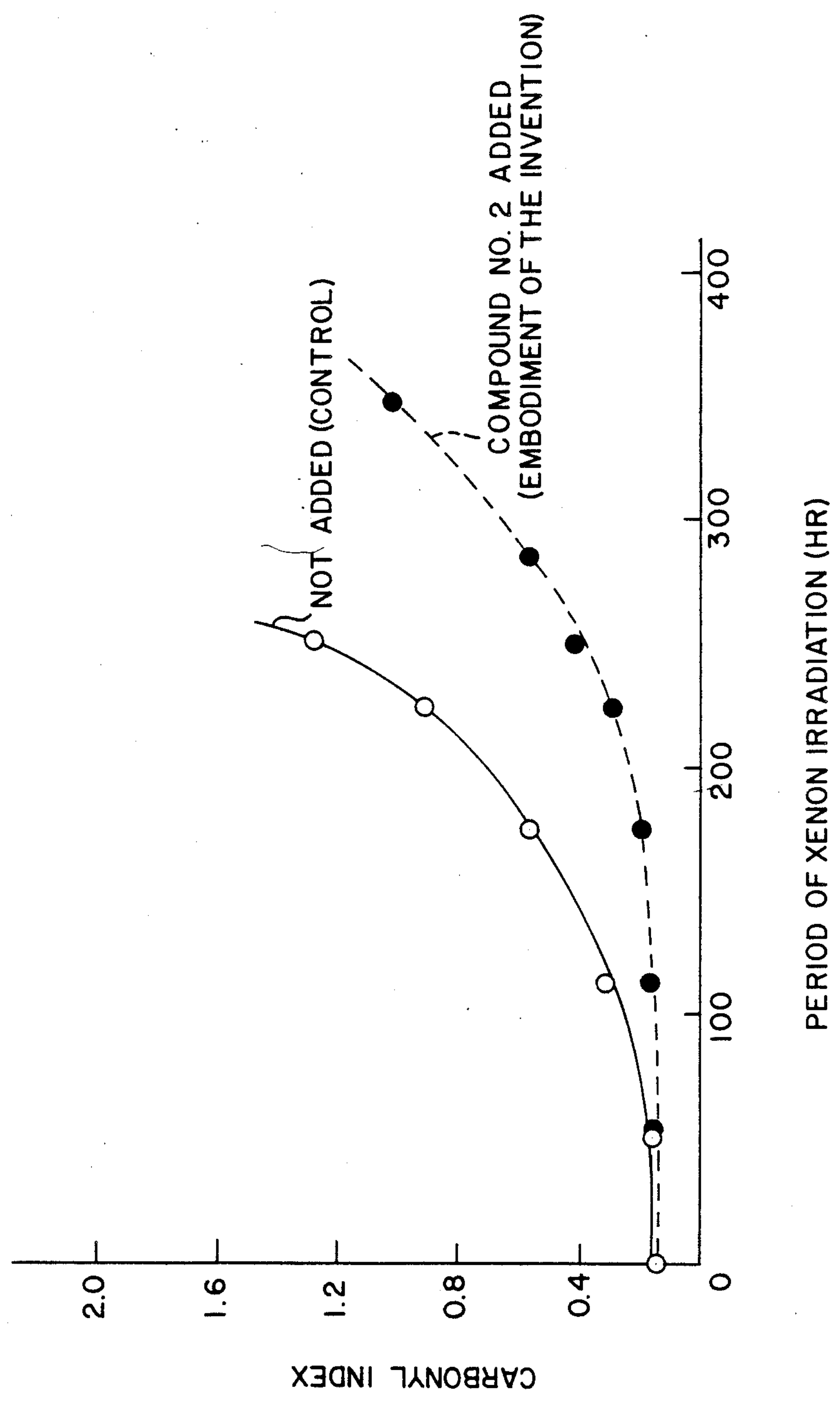
FIG. 1 is a graph showing the variation of the carbonyl index of polypropylene to which a compound of the invention (No. 2) was added (dotted line) or not added (full line).

In the compounds of the above-mentioned formulae (I), (II) and (III), the halogen atom for $R^1$ to $R^5$, $R^{10}$ to $R^{14}$ and $R^{17}$ to $R^{21}$ includes fluorine, chlorine, bromine and iodine.

The alkyl group for $R^1$ to $R^5$, $R^{10}$ to $R^{14}$ and $R^{17}$ to $R^{21}$is preferably an alkyl group having from 1 to 20 carbon atoms, which may be linear or branched, and substituted or unsubstituted.

The aryl group for $R^1$ to $R^5$, $R^{10}$ to $R^{14}$ and $R^{17}$ to $R^{21}$ is preferably an aryl group having from 6 to 14 carbon atoms, which may be substituted or unsubstituted.

The heterocyclic group for $R^1$ to $R^5$, $R^{10}$ to $R^{14}$ and $R^{17}$ to $R^{21}$ is preferably a 5-membered or 6-membered heterocyclic group, which may be substituted or unsubstituted.

The cycloalkyl group for $R^1$ to $R^5$, $R^{10}$ to $R^{14}$ and $R^{17}$ to $R^{21}$ is preferably a 5-membered or 6-membered group, which may be substituted or unsubstituted.

When the adjacent substituents of $R^1$ to $R^5$, $R^{10}$ to $R^{14}$ and $R^{17}$ to $R^{21}$ are bonded together to form a ring, the ring is preferably a 6-membered ring, more preferably a benzene ring which may be substituted or unsubstituted, or may be condensed.

As the linear or branched alkyl group for $R^1$ to $R^5$, $R^{10}$ to $R^{14}$ and $R^{17}$ to $R^{21}$, there are, for example, methyl, ethyl, propyl, butyl, hexyl, octyl, decyl, dodecyl, tetradecyl, hexadecyl and octadecyl groups.

The aryl group for $R^1$ to $R^5$, $R^{10}$ to $R^{14}$ and $R^{17}$ to $R^{21}$ includes, for example, phenyl and naphthyl groups The heterocyclic group for $R^1$ to $R^5$, $R^{10}$ to $R^{14}$ and $R^{17}$ to $R^{21}$ is preferably a 5- or 6-membered heterocyclic group having at least one nitrogen, oxygen or sulfur atom, as a tetero atom, in the ring, which includes, for example, furyl, hydrofuryl, thienyl, pyrrolyl, pyrrolidiyl, pyridyl, imidazolyl, pyrazolyl, quinolyl, indolyl, oxazlyl and thiazolyl groups.

The cycloalkyl group for $R^1$ to $R^5$, $R^{10} R^{14}$ and $R^{17}$ to $R^{21}$ includes, for example, cyclopentyl, cyclohexyl, cyclohexenyl or cyclohexadienyl groups.

The 6-membered ring to be formed by the adjacent substituents of $R^1$ to $R^5$, $R^{10}$ to $R^{11}$ and $R^{17}$ to $R^{21}$ includes, for example, benzene, naphthalene, isobenzothiophene, isobenzofuran and isoindoline rings.

The above-mentioned alkyl group, cycloalkyl group, aryl group or heterocyclic group for $R^1$ to $R^5$, $R^{10}$ to $R^{14}$ and $R^{17}$ to $R^{21}$ may be bonded to the carbon atom on the benzene ring via a divalent linking group, such as an oxy group (—O—), a thio group (—S—), an amino group, an oxycarbonyl group, a carbonyl group, a carbamoyl group, a sulfamoyl group, a carbonylamino group, a sulfonyl group or a carbonyloxy group.

Examples of the bonded alkyl group including $R^1$ to $R^5$, $R^{10}$ to $R^{14}$ and $R^{17}$ to $R^{21}$, which is bonded to the carbon atom on the benzene ring via the above-mentioned divalent linking group, include an alkoxy group (e.g., methoxy, ethoxy, butoxy, propoxy, n-decyloxy, n-dodecyloxy, n-hexadecyloxy), an alkoxycarbonyl group (e.g., methoxycarbonyl, ethoxycarbonyl, butoxycarbonyl, n-decyloxycarbonyl, n-hexadecyloxycarbonyl), an acyl group (e.g., acetyl, valeryl, stearoyl), an acyloxy group (e.g., acetoxy, hexadecylcarbonyloxy), an alkylamino group (e.g., n-butylamino, N,N-diethylamino, N,N-didecylamino), an alkylsulfamoyl group (e.g., butylsulfamoyl, N,N-diethylsulfamcyl, n-dodecylsulfamoyl), a sulfonylamino group (e.g., methylsulfonylamino, butylsulfonylamino), a sulfonyl group (e.g., methyl, ethanesulfonyl), and an acylamino group (e.g., acetylamino, valerylamino, palmitoylamino, benzoylamino, toluoylamino).

Examples of the bonded cycloalkyl group including $R^1$ to $R^5$, $R^{10}$ to $R^{14}$ and $R^{17}$ to $R^{21}$, which is bonded to the carbon atom on the benzene ring via the above-mentioned divalent linking group, include cyclohexyloxy, cyclohexylcarbonyl, cyclohexyloxycarbonyl, cyclohexylamino, cyclohexenylcarbonyl and cyclohexenyloxy groups.

Examples of the bonded aryl group including $R^1$ to $R^5$, $R^{10}$ to $R^{14}$ and $R^{17}$ to $R^{21}$, which is bonded to the carbon atom on the benzene ring via the above-mentioned divalent linking group, include an aryloxy group (e.g., phenoxy, naphthoxy), an aryloxycarbonyl group (e.g., phenoxycarbonyl, naphthoxycarbonyl), an acyl group (e.g., benzoyl, naphthoyl), an anilino group (e.g., phenylamino, N-methylanilino, N-acetylanilino), an acyloxy group (e.g., benzoyloxy, toluoyloxy), an arylcarbamoyl group (e.g., phenylcarbamoyl), an arylsulfamoyl group (e.g., phenylsulfamoyl), an arylsulfonylamino group (e.g., phenylsulfonylamino, p-tolylsulfonylamino), an arylsulfonyl group (e.g., benzenesulfonyl, tosyl), and an acylamino group (e.g., benzoylamino).

The above-mentioned alkyl group, aryl group, heterocyclic group or cycloalkyl group for $R^1$ to $R^5$, $R^{10}$ to $R^{14}$ and $R^{17}$ to $R^{21}$ as well as the 6-membered ring formed by the adjacent substituents of them may be substituted by one or more substituents selected from a halogen atom (e.g., chlorine, bromine, fluorine), a cyano group, a hydroxyl group, a linear or branched alkyl group (e.g., methyl, ethyl, propyl, butyl, hexyl, octyl, decyl, dodecyl, tetradecyl, hexadecyl, heptadecyl, octadecyl, methoxyethoxyethyl), an aryl group (e.g., phenyl, tolyl, naphthyl, chlorophenyl, methoxyphenyl, acetylphenyl), an alkoxy group (e.g., methoxy, ethoxy, butoxy, propoxy, methoxyethoxy), an aryloxy group (e.g., phenoxy, tolyloxy, naphthoxy, methoxyphenoxy), an alkoxycarbonyl group (e.g., methoxycarbonyl, butoxycarbonyl, phenoxymethoxycarbonyl), an aryloxycarbonyl group (e.g., phenoxycarbonyl, tolyloxycarbonyl, methoxyphenoxycarbonyl), an acyl group (e.g., formyl, acetyl, valeryl, stearoyl, benzoyl, toluoyl, naphthoyl, p-methoxybenzoyl), an acyloxy group (e.g., acetoxy, benzoyloxy), an acylamino group (e.g., acetamido, benzamido, methoxyacetamido), an anilino group (e.g., phenylamino, N-methylanilino, N-phenylanilino, N-acetylanilino), an alkylamino group (e.g., n-butylamino, N,N-diethylamino, 4-methoxy-n-butylamino), a carbamoyl group (e.g., n-butylcarbamoyl, N,N-diethylcarbamoyl, n-butylsulfamoyl, N,N-diethylsulfamoyl, n-dodecylsulfamoyl, N-(4-methoxy-n-butyl)sulfamoyl), a sulfonylamino group (e.g., methylsulfonylamino, phenylsulfonylamino, methoxymethylsulfonylamino), and a sulfonyl group (e.g., mesyl, tosyl, methoxymethanesulfonyl).

The alkyl group for $R^6$ and $R^7$ is preferably an alkyl group having from 1 to 20 carbon atoms, which includes, for example, methyl, ethyl, n-butyl, n-hexyl, n-octyl, n-dodecyl and n-hexadecyl groups.

The aryl group for $R^6$ and $R^7$ is preferably a phenyl group, which may optionally be substituted by, for example, a methyl group, a methoxy group or a halogen atom.

The alkyl group for $R^8$, $R^9$, $R^{15}$, $R^{16}$, $R^{22}$ and $R^{23}$ is preferably an alkyl group having from 1 to 20 carbon atoms, which includes, for example, methyl, ethyl, n-butyl, n-hexyl, n-octyl, n-dodecyl and n-hexadecyl groups The alkyl group can be substituted by one or more substituents selected from, for example, an alkyl group having from 1 to 20 carbon atoms (e.g., methyl, ethyl, n-butyl, n-octyl) and an alkoxy group having from 1 to 20 carbon atoms (e.g., methoxy, ethoxy, n-butoxy).

The aryl group for $R^8$, $R^9$, $R^{15}$, $R^{16}$, $R^{22}$ and $R^{23}$ is preferably a phenyl group, which may further be substituted by one or more substituents selected from, for example, an alkyl group having from 1 to 20 carbon atoms (e.g., methyl, ethyl, n-butyl, n-octyl, n-decyl), an alkoxy group having from 1 to 20 carbon atoms (e.g., methoxy, ethoxy, n-butoxy, n-dodecyloxy), and a cyano group.

$R^8$ and $R^9$, $R^{15}$ and $R^{16}$, $R^{22}$ and $R^{23}$ each may be bonded together to form a ring, which is preferably a 5-membered or 6-membered ring where the ring-constituting elements may be elements (e.g., O, N, S) other than carbon. The ring may optionally be substituted by one or more substituents selected from a halogen atom, an alkyl group and an alkoxy group, and this may optionally be condensed with additional ring(s).

The (α-diimine)(cis-1,2-ethylenedithiolato)nickel derivatives represented by the aforesaid formulae (I) to (III) may be prepared, for example, as mentioned below.

Briefly, a cis-1,2-3thylenedithiol derivative or an alkali metal salt thereof is dissolved in anhydrous methanol. (If possible, the solution may be prepared from a precursor of the derivative. ) A bis(α-diimine)-nickel(II) halide or (o-diimine)(dihalo)nickel(II) complex is added to the said solution in the form of a powder or a methanol solution and stirred, and the precipitate formed is filtered. The resulting precipitate is extracted from an organic solvent such as dichloromethane and concentrated, and then methanol is gradually added thereto to obtain a crystal of the intended complex.

Examples of preferred compounds of the aforesaid formulae (I) to (III) are mentioned below, which, however, are not intended to restrict the scope of the present invention.

(1)

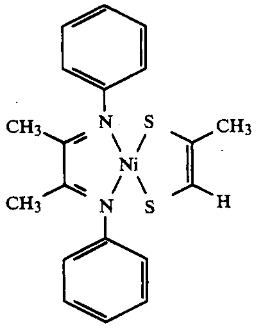

(2)

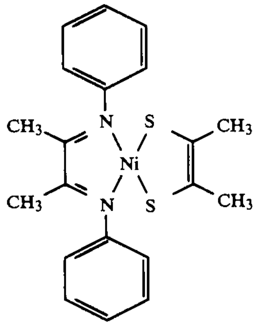

(3)

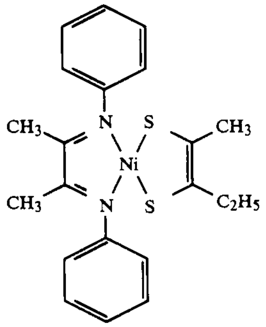

-continued (4)

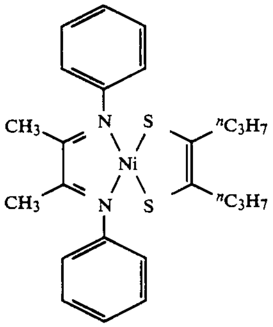

(5)

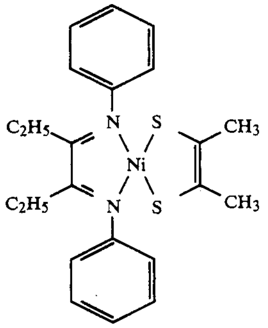

(6)

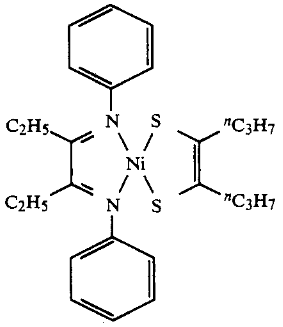

(7)

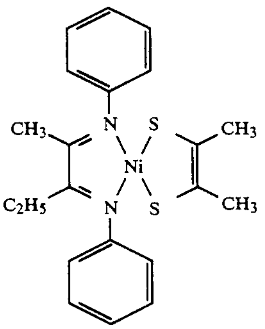

-continued
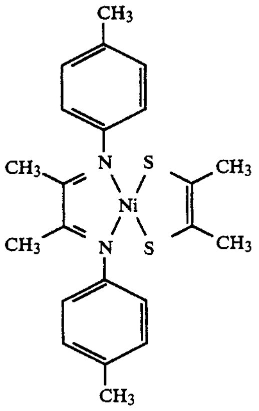
(8)
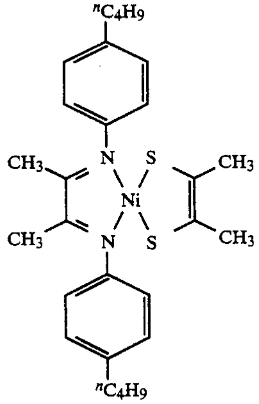
(9)
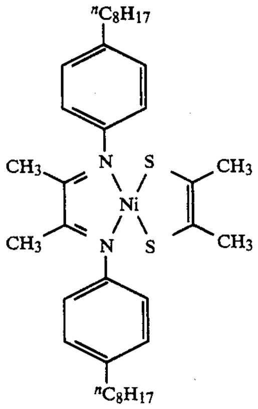
(10)
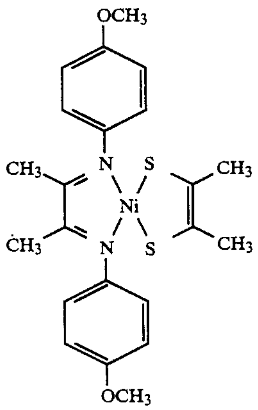
(11)
-continued
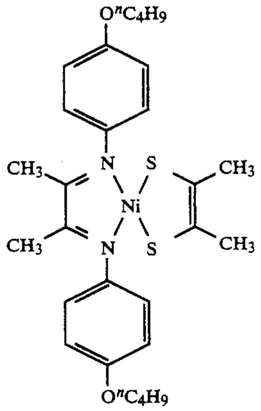
(12)
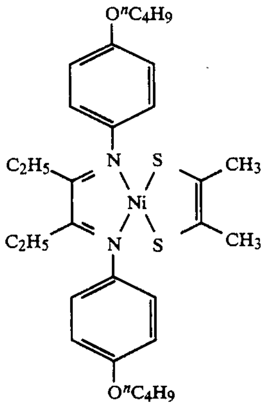
(13)
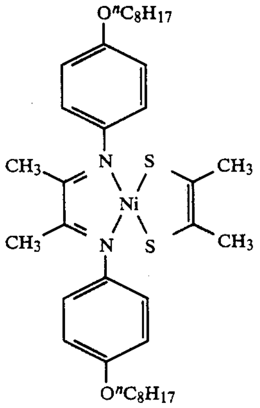
(14)
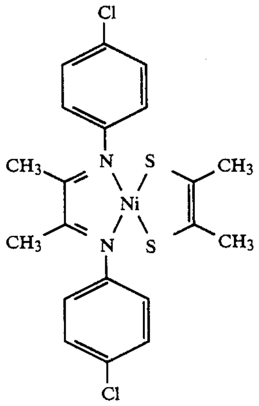
(15)

-continued
(16)
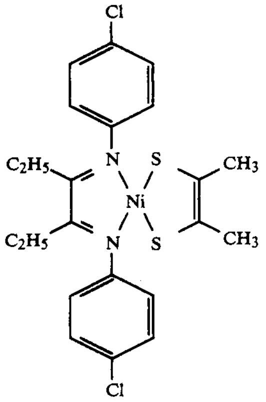
(17)
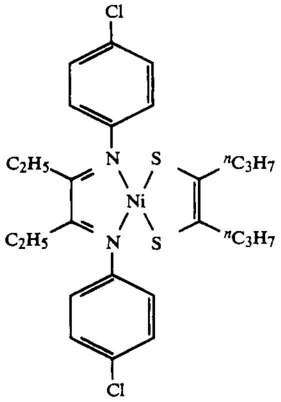
(18)
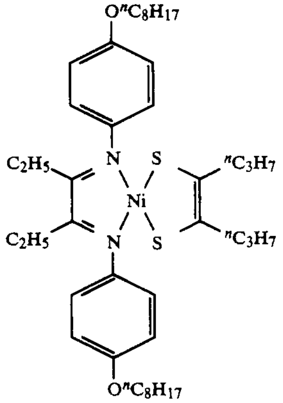
(19)
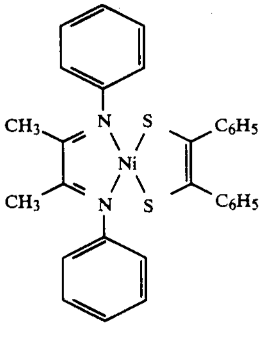
-continued
(20)
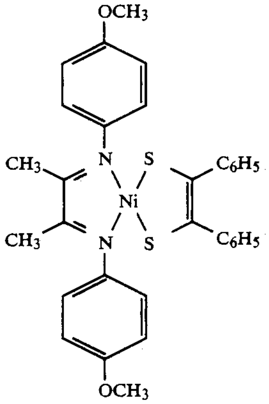
(21)
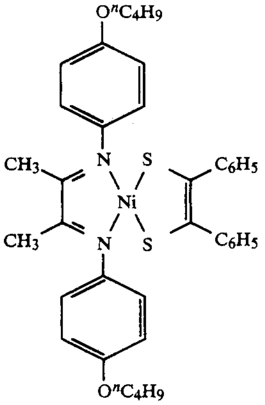
(22)
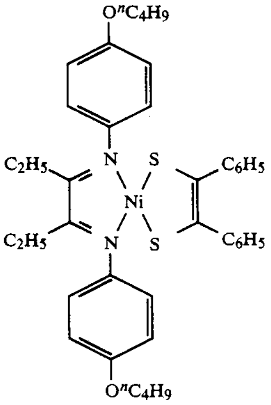

-continued
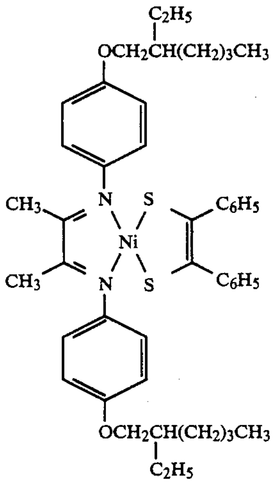
(23)
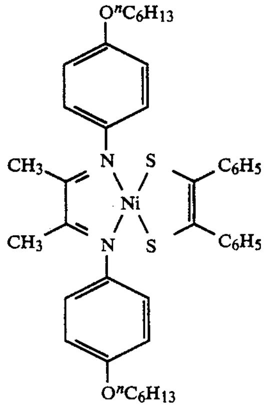
(24)
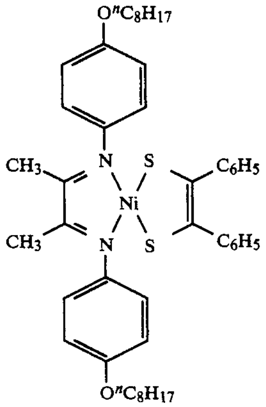
(25)
-continued
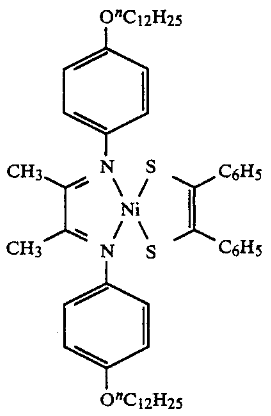
(26)
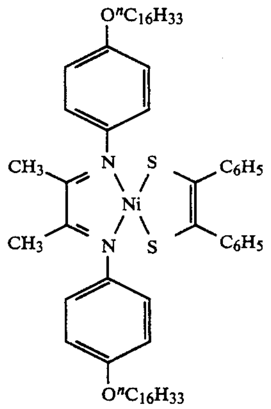
(27)
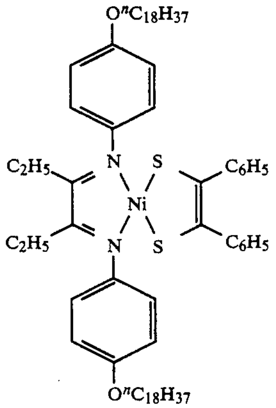
(28)
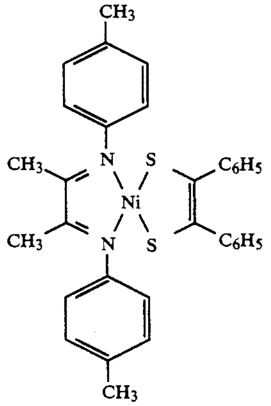
(29)

-continued
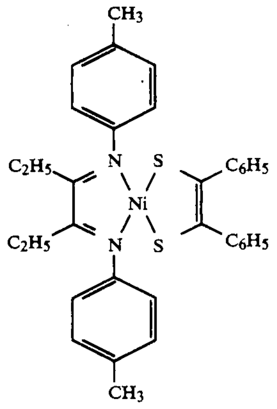
(30)
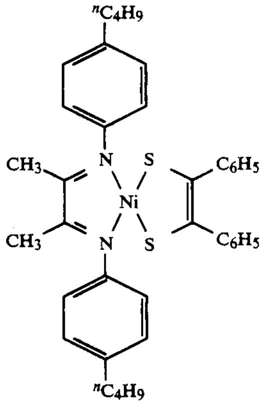
(31)
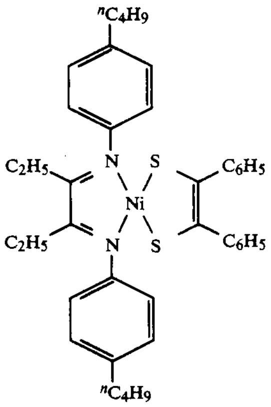
(32)
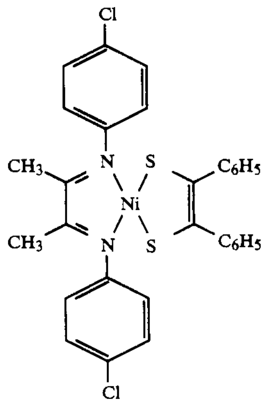
(33)
-continued
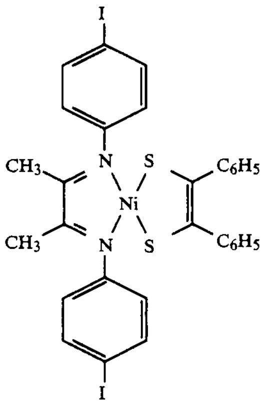
(34)
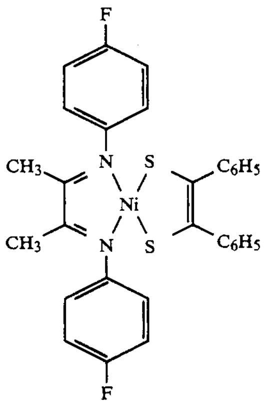
(35)
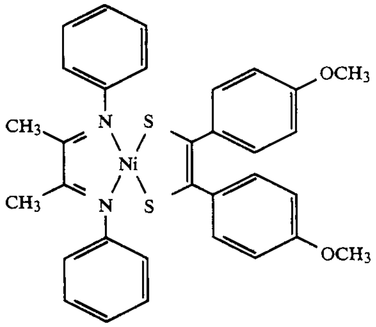
(36)
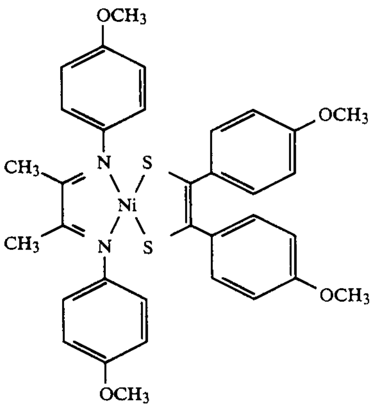
(37)

-continued
(38)
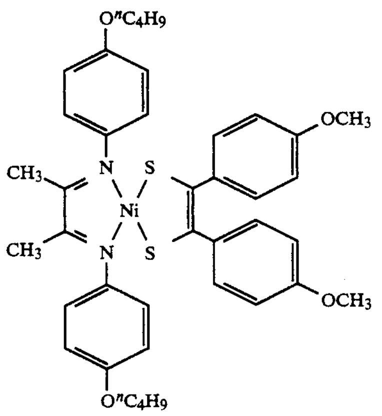
(39)
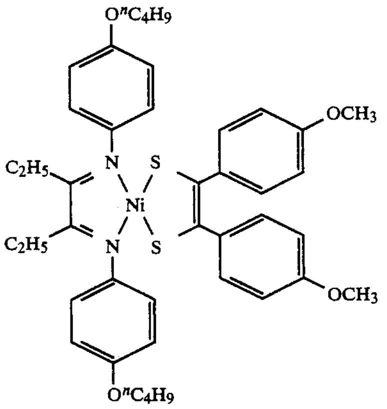
(40)
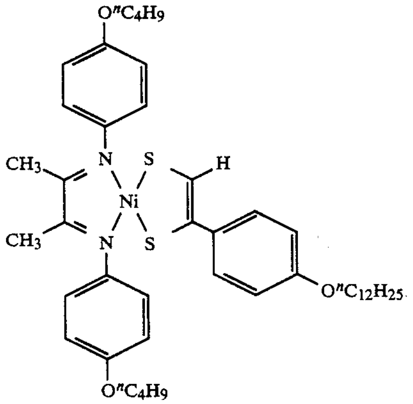
(41)
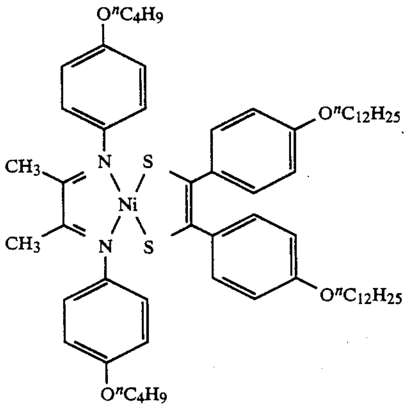
-continued
(42)
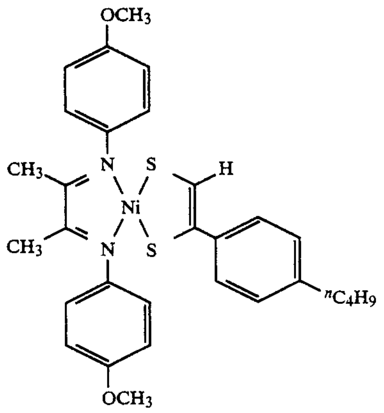
(43)
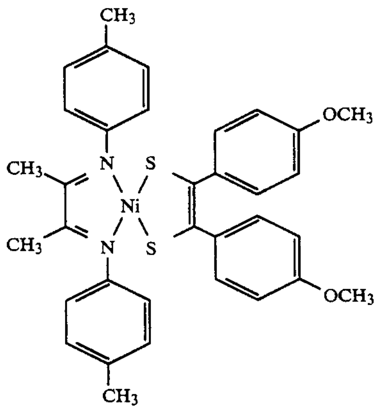
(44)
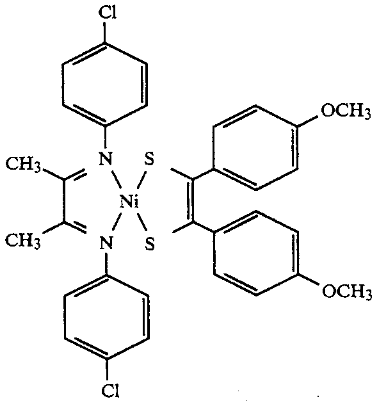
(45)
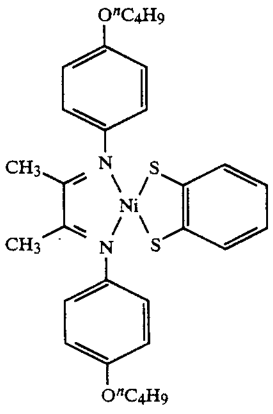

-continued
(46)
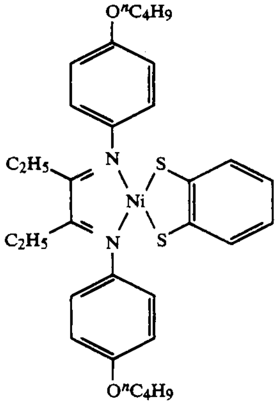
(47)
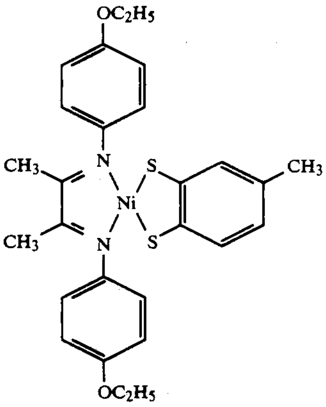
(48)
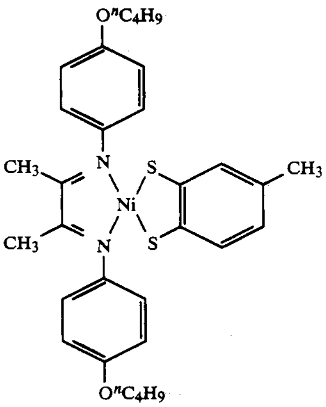
(49)
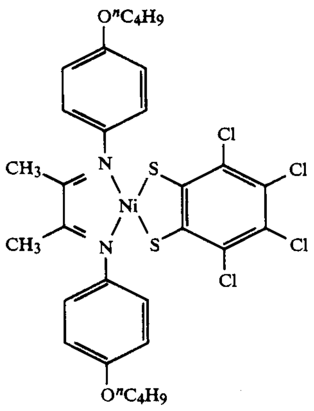
-continued
(50)
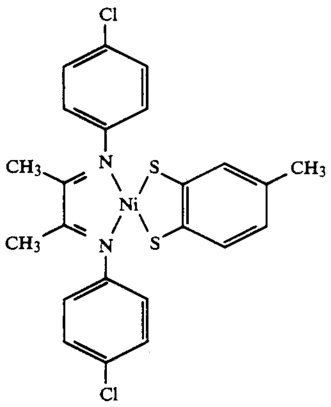
(51)
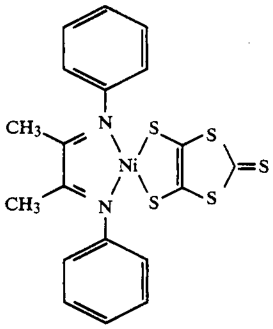
(52)
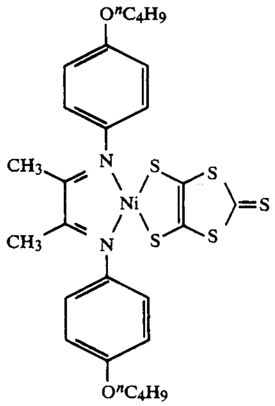
(53)
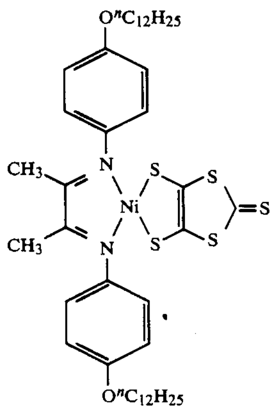

-continued
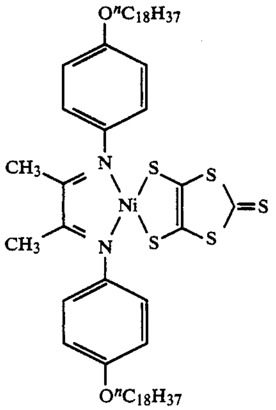
(54)
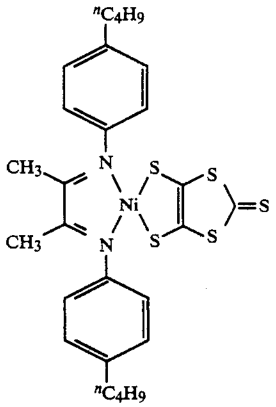
(55)
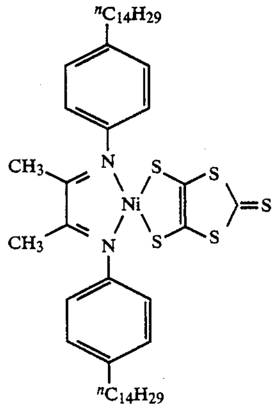
(56)
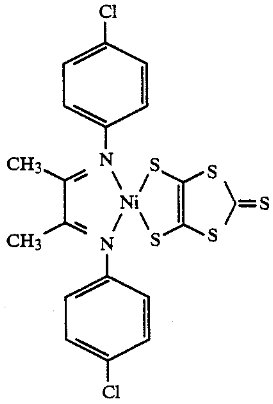
(57)
-continued
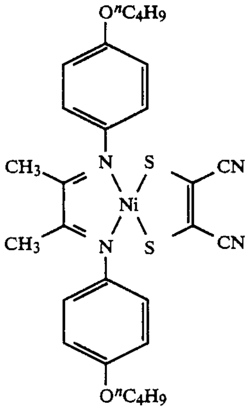
(58)
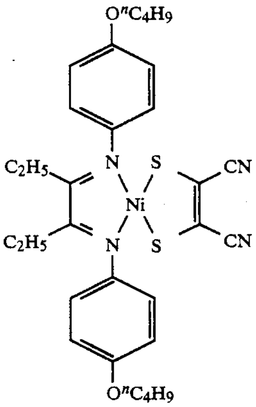
(59)
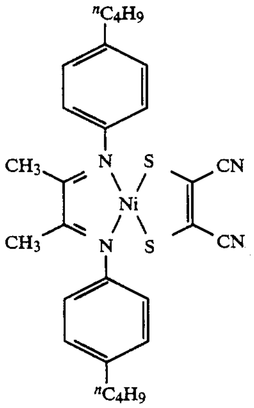
(60)
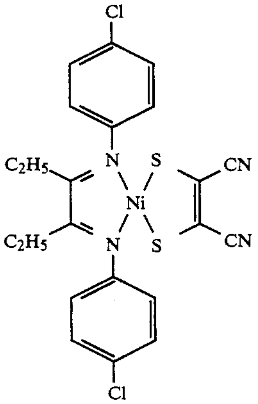
(61)

-continued
(62)
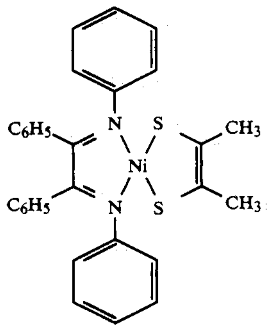
(63)
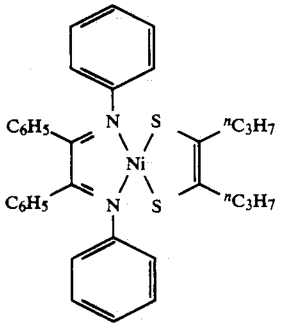
(64)
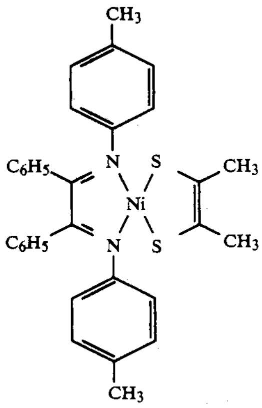
(65)
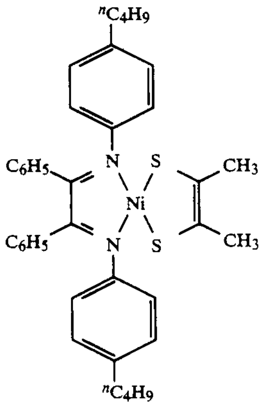
-continued
(66)
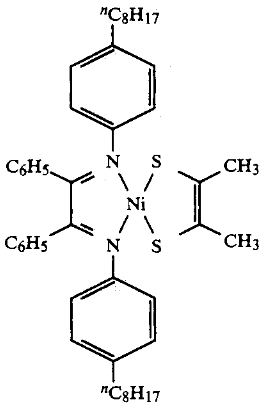
(67)
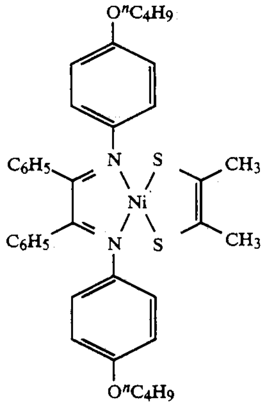
(68)
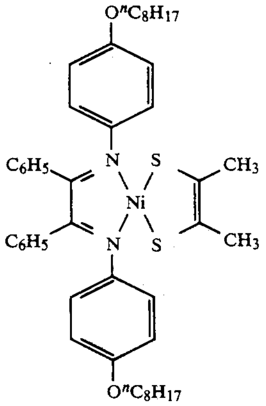
(69)
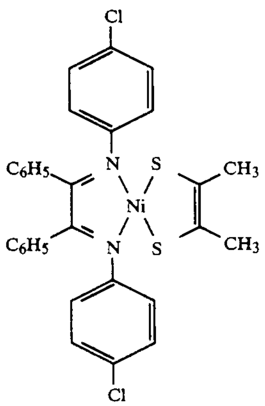

-continued
(70)
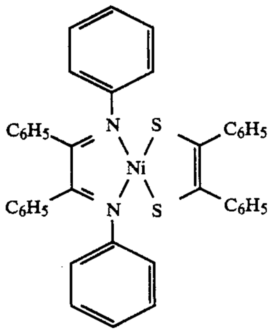
(71)
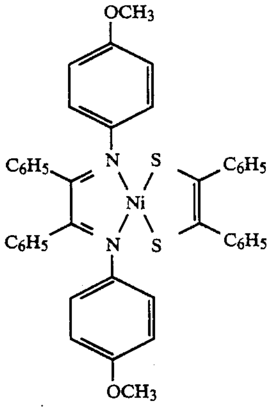
(72)
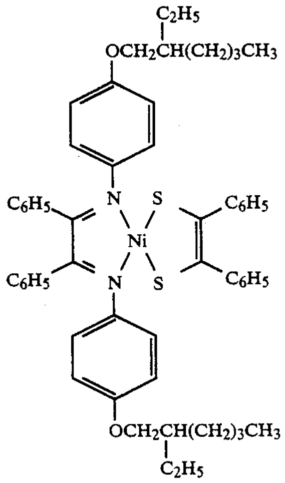
(73)
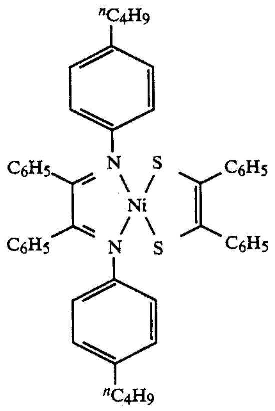
-continued
(74)
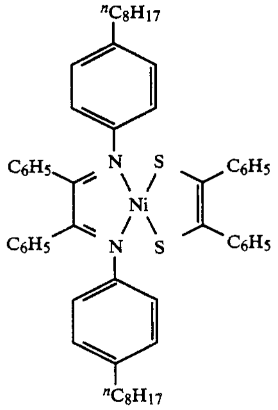
(75)
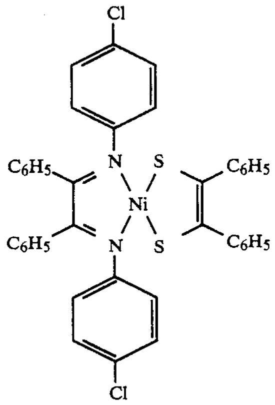
(76)
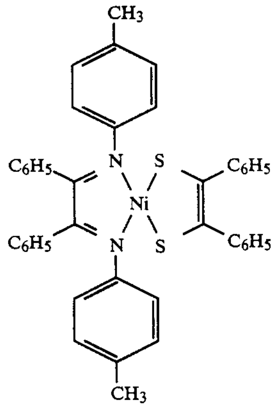
(77)
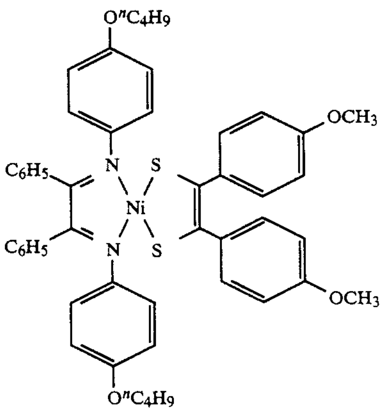

-continued
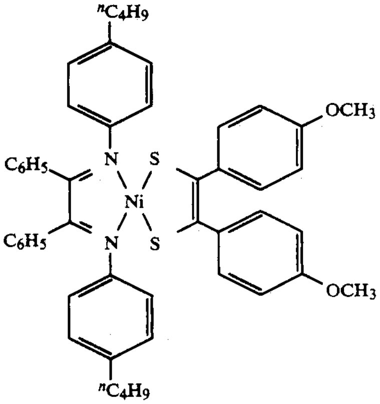
(78)
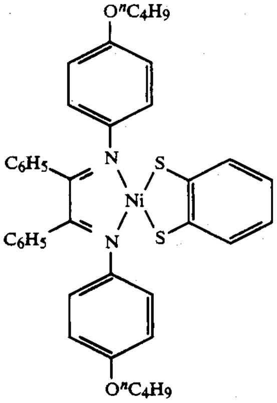
(79)
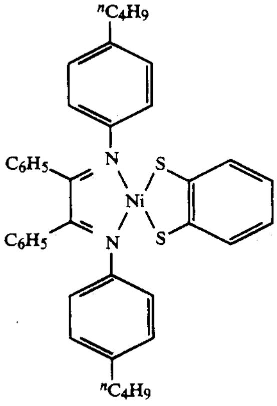
(80)
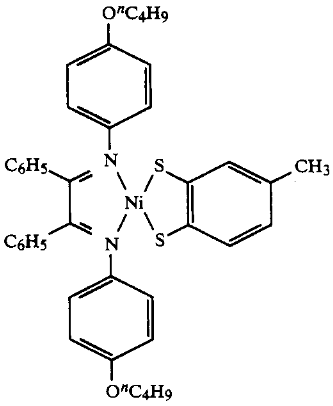
(81)
-continued
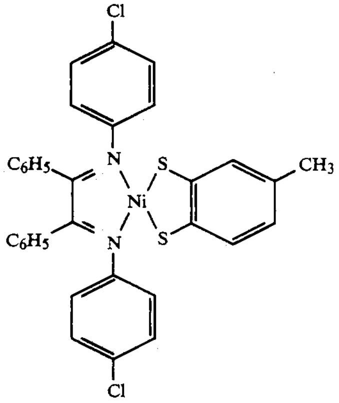
(82)
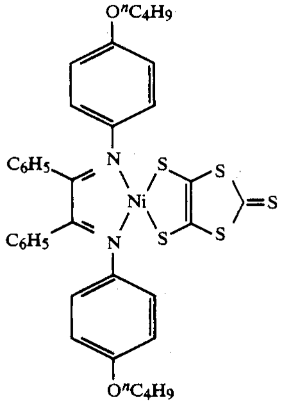
(83)
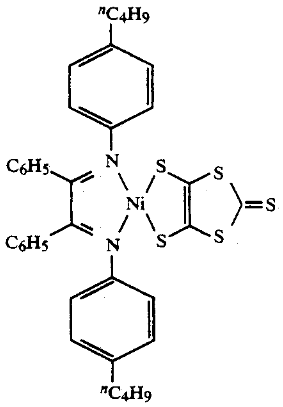
(84)
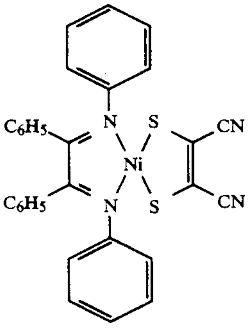
(85)

-continued
(86)
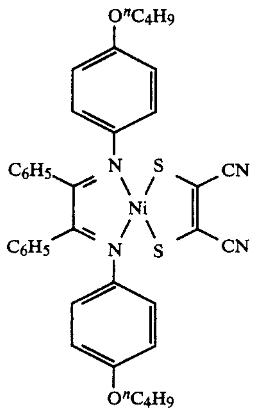
(87)
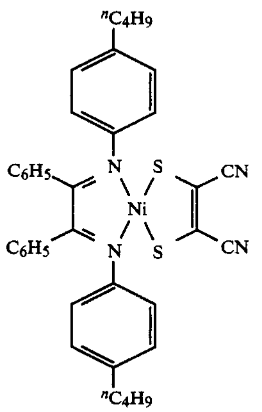
(88)
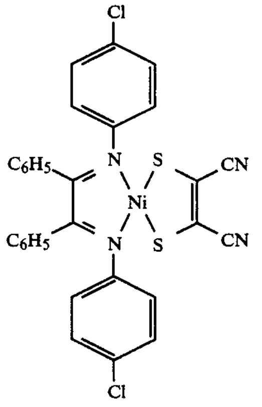
(89)
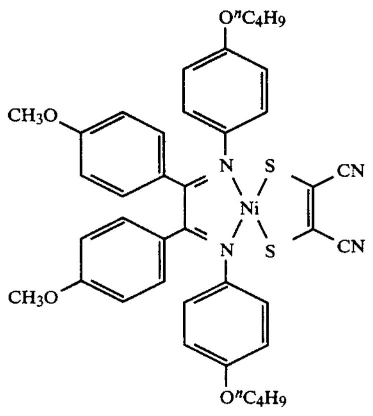
-continued
(90)
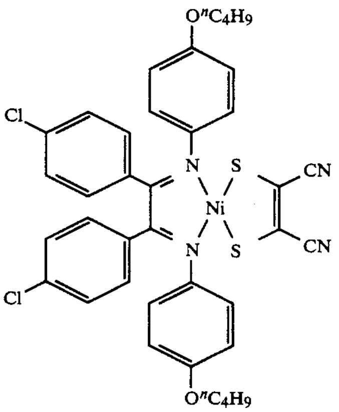
(91)
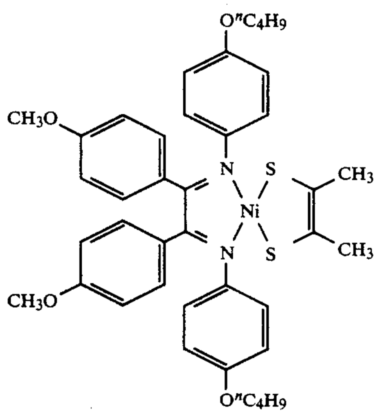
(92)
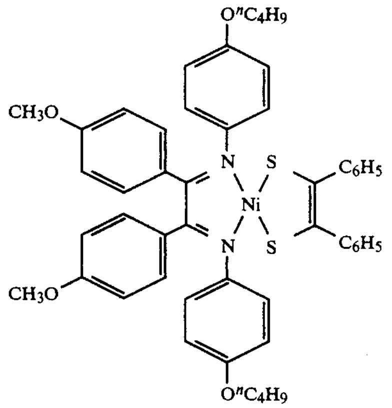
(93)
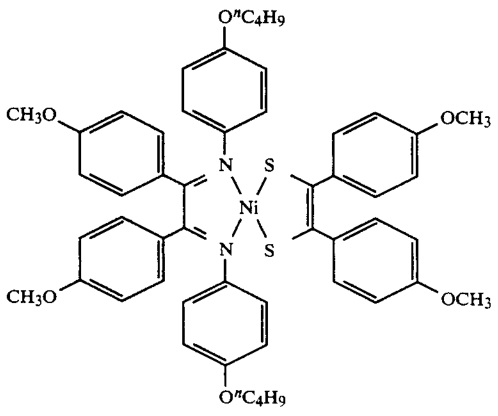

-continued
(94)
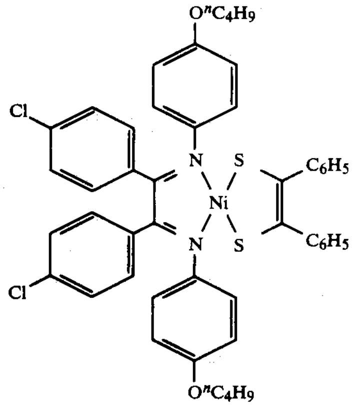
(95)
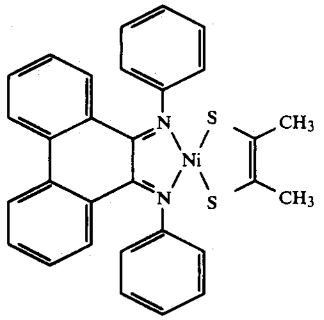
(96)
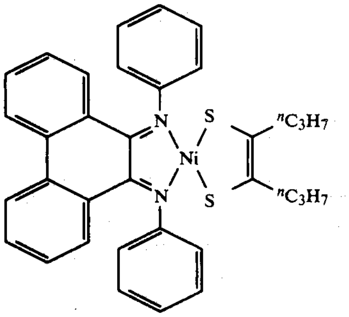
(97)
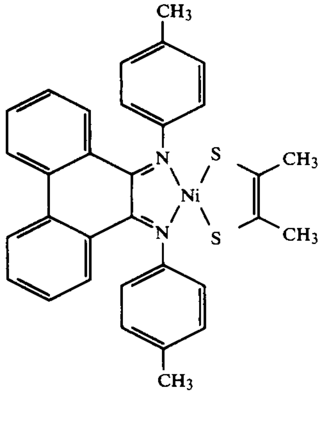
-continued
(98)
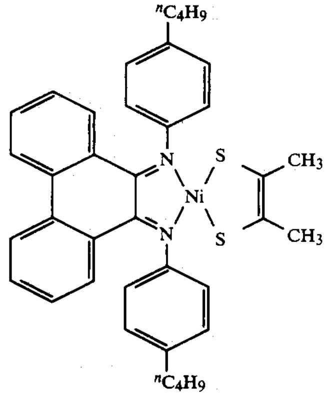
(99)
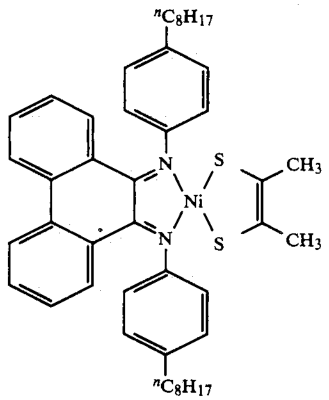
(100)
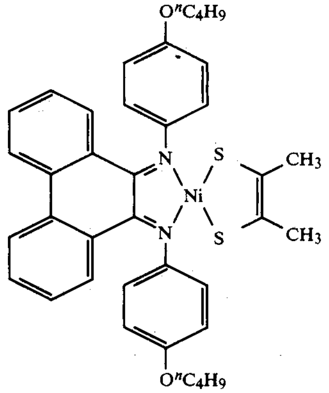
(101)
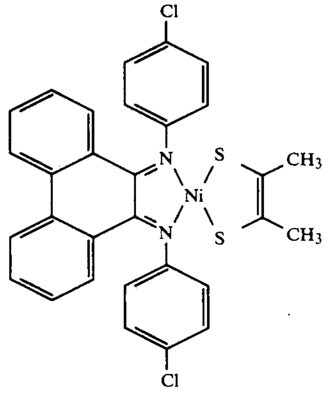

-continued
(102)
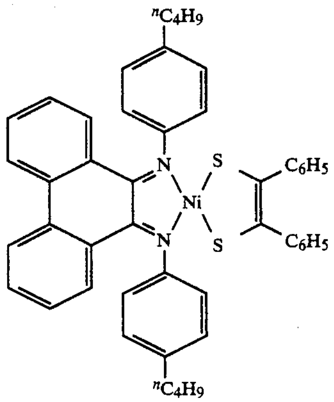
(103)
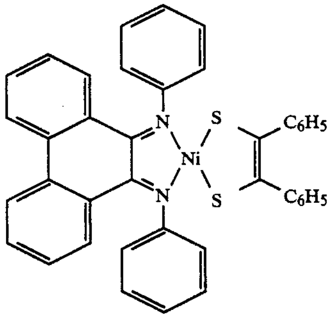
(104)
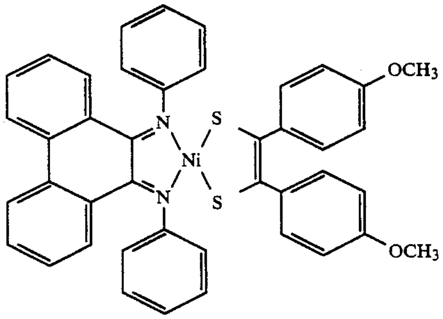
(105)
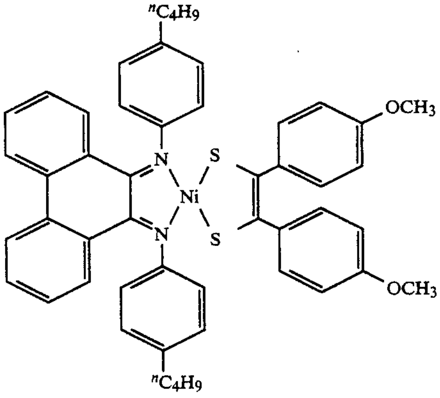
-continued
(106)
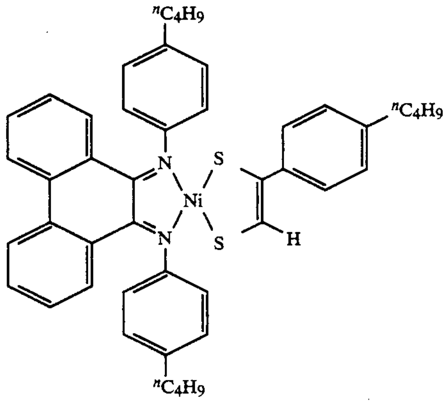
(107)
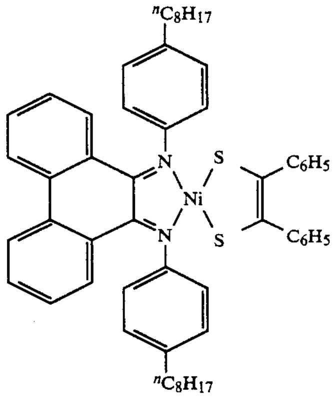
(108)
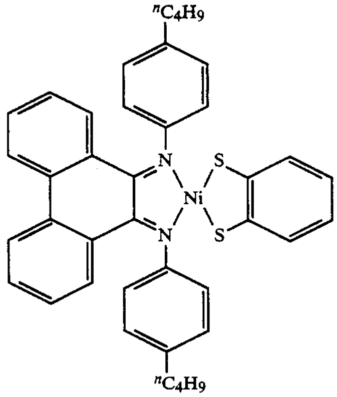
(109)
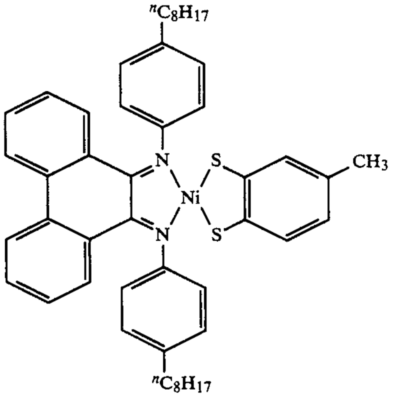

-continued
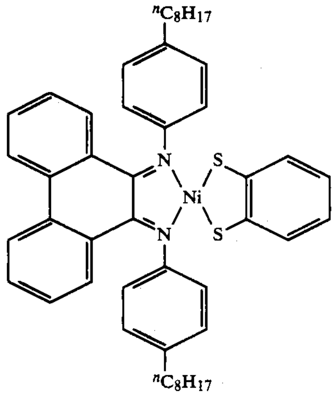
(110)
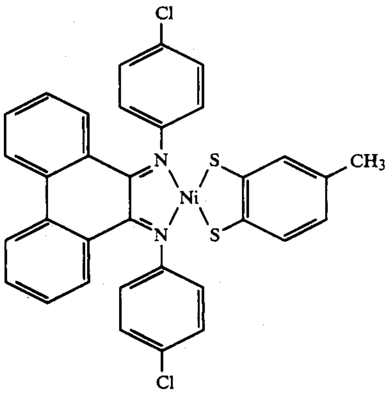
(111)
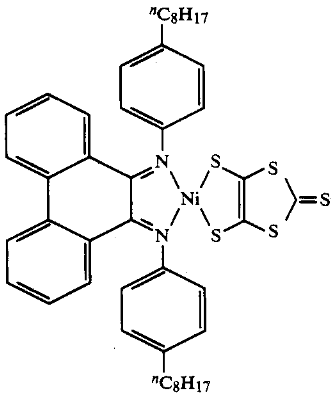
(112)
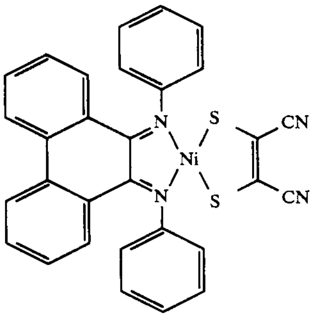
(113)
-continued
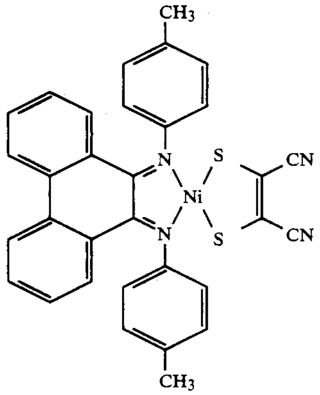
(114)
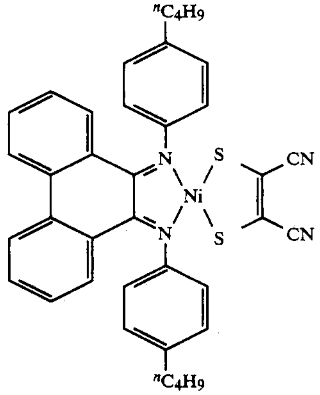
(115)
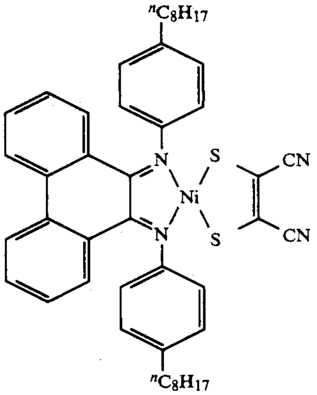
(116)
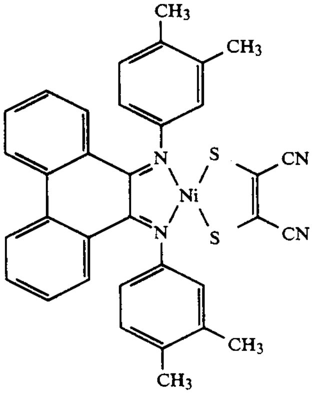
(117)

-continued
(118)
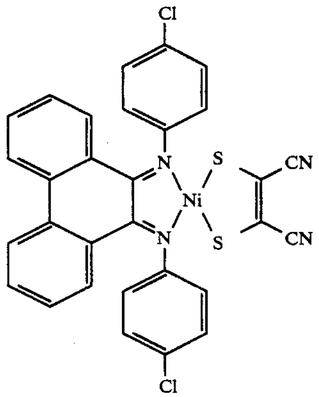
(119)
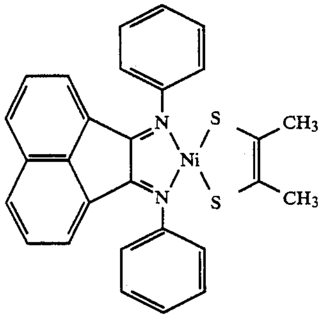
(120)
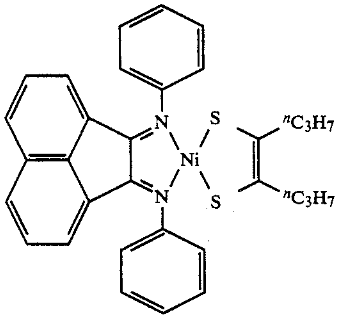
(121)
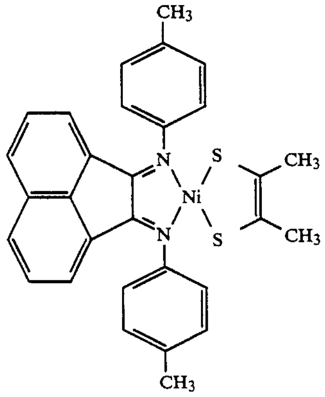
-continued
(122)
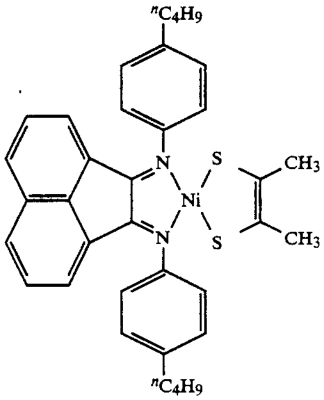
(123)
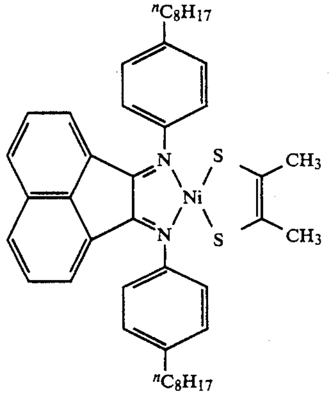
(124)
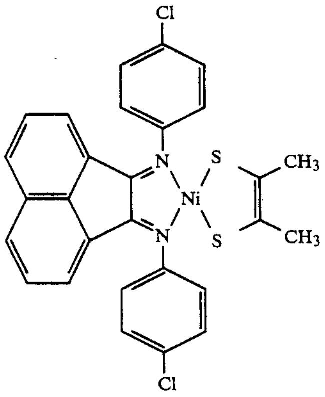
(125)
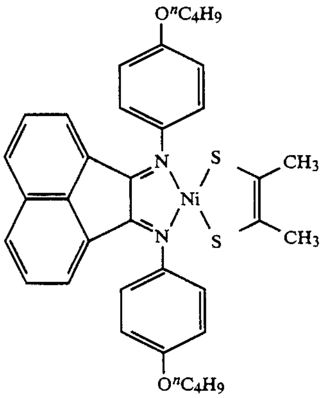

-continued
(126)
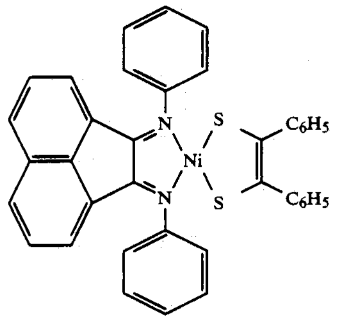
(127)
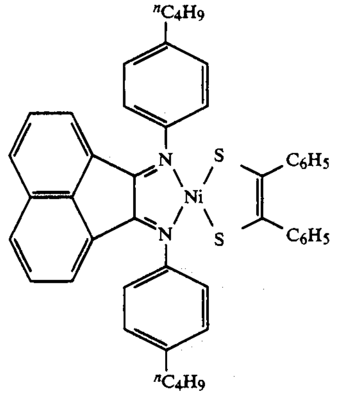
(128)
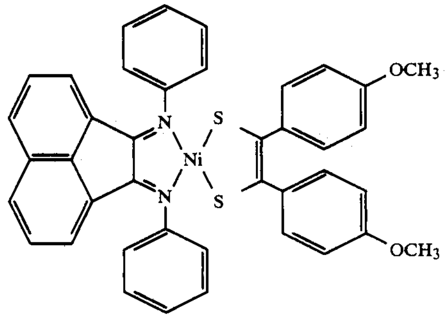
(129)
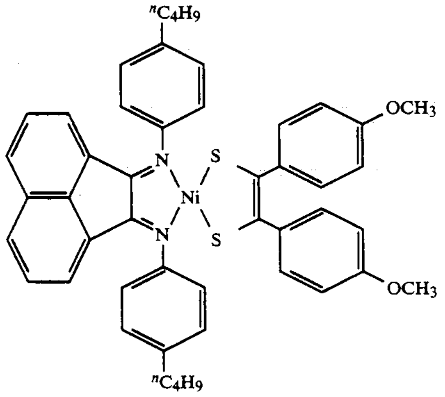
-continued
(130)
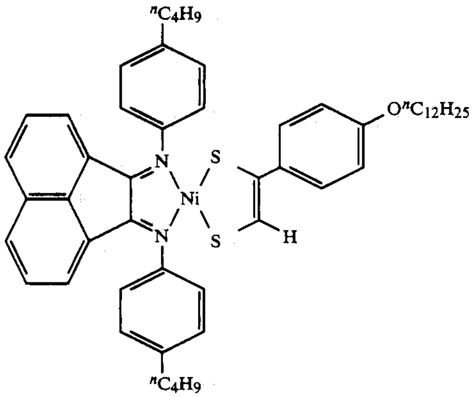
(131)
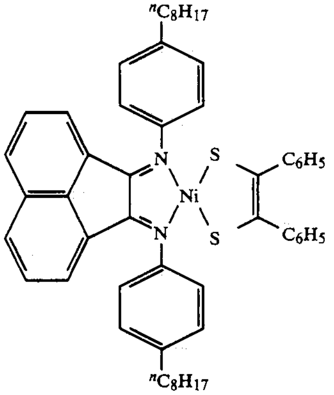
(132)
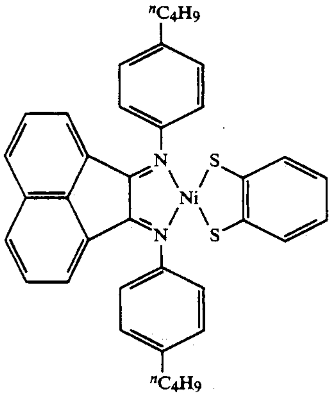
(133)
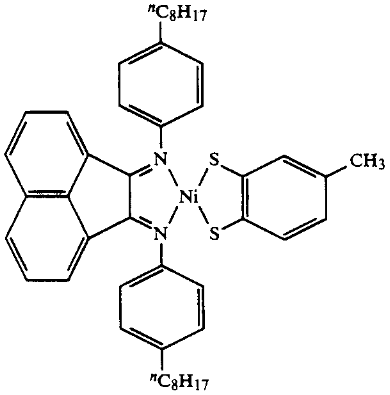

-continued
(134)
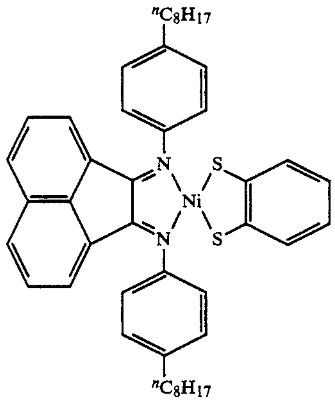
(135)
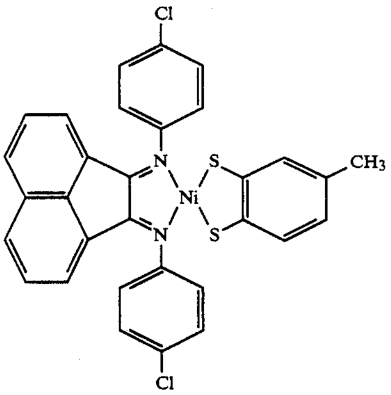
(136)
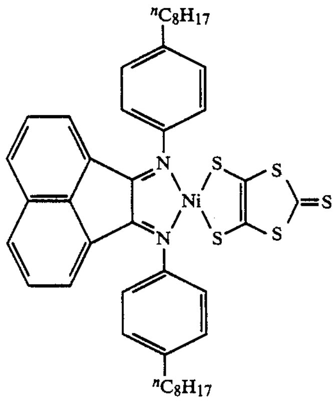
(137)
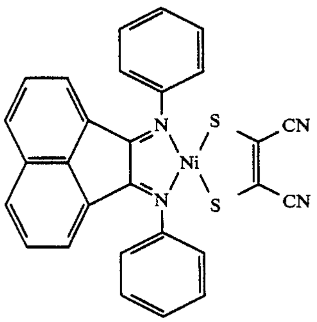
-continued
(138)
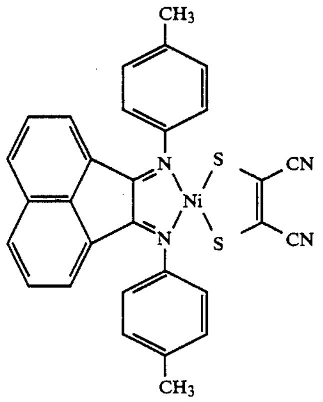
(139)
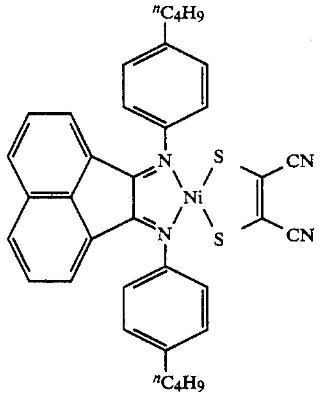
(140)
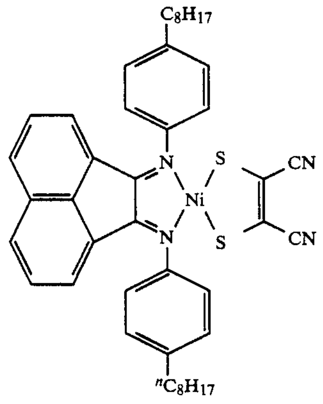
(141)
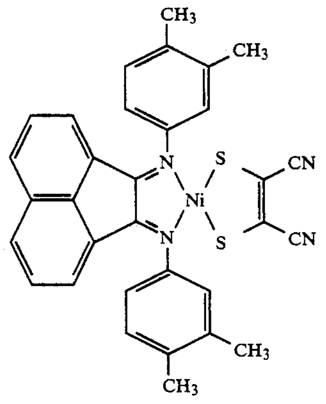

-continued
(142)
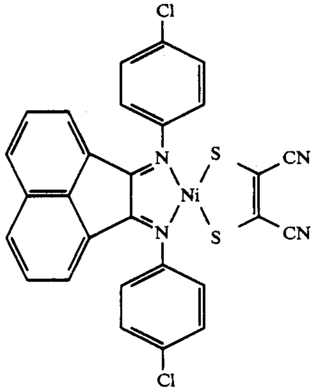
(143)
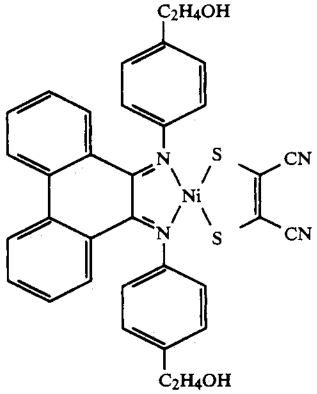
(144)
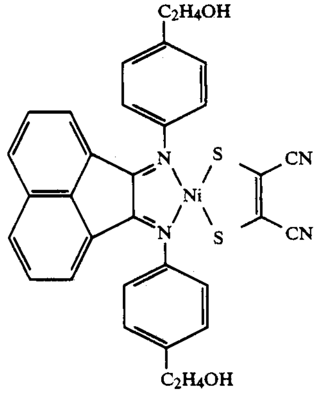
(145)
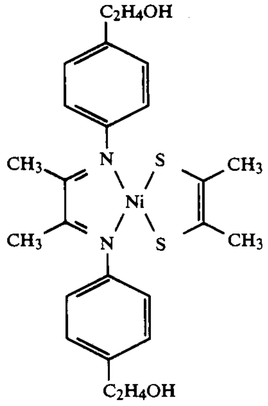
-continued
(146)
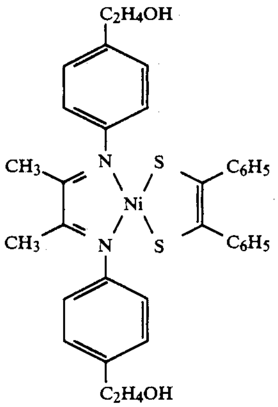
(147)
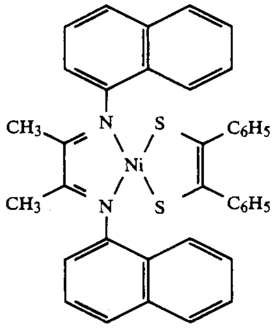
(148)
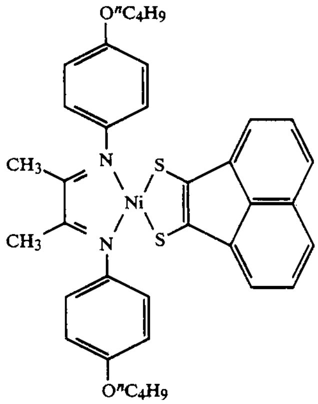
(149)
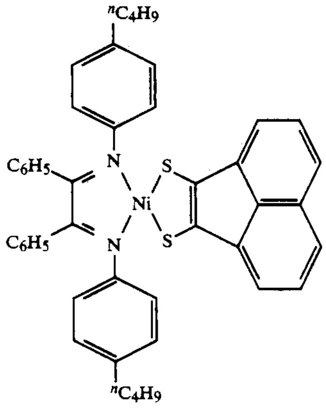

-continued (150)

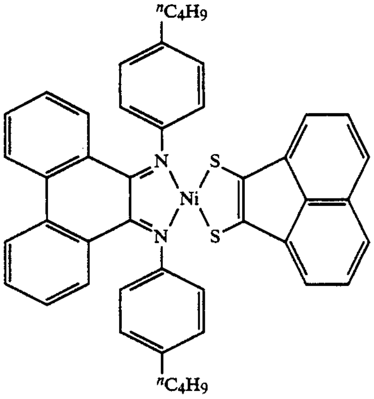

(151)

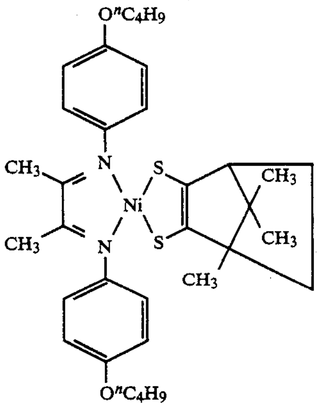

(152)

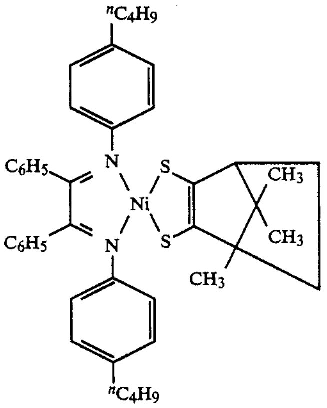

(153)

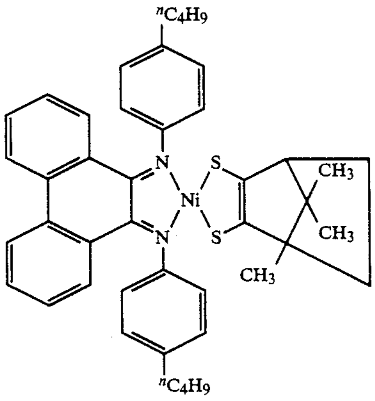

For some of these compounds, the absorption maximum ($\lambda_{max}$), the molar extinction coefficient ($\epsilon_{max}$; liter·mol$^{-1}$·cm$^{-1}$) and the melting point (decomposition point) are shown in Table 1 below.

TABLE 1

| Compound | $\lambda_{max}$ (nm) | $\epsilon_{max}$ ($\times 10^4$) | m.p. (°C.) |
| --- | --- | --- | --- |
| (2) | 781 | 0.88 | 212 |
| (11) | 780 | 0.79 | 215–220 |
| (19) | 756 | 1.15 | 164–166 |
| (20) | 754 | 0.94 | 265–270 |
| (21) | 754 | 0.91 | 179–195 |
| (22) | 766 | 1.07 | 195–197 |
| (23) | 754 | 1.00 | 166–169 |
| (24) | 756 | 0.98 | 171–174 |
| (25) | 756 | 0.90 | 164–167 |
| (26) | 756 | 0.96 | 148–153 |
| (27) | 754 | 0.97 | 163–170 |
| (28) | 762 | 0.77 | 118–120 |
| (33) | 775 | 0.97 | 233–238 |
| (34) | 780 | 1.06 | 240–243 |
| (35) | 770 | 1.11 | 200–202 |
| (38) | 774 | 0.88 | 210–212 |
| (47) | 690 | 0.92 | 259–262 |
| (48) | 688 | 0.90 | 245–247 |
| (51) | 735 | 0.79 | >300 |
| (52) | 728 | 0.77 | 220–223 |
| (53) | 727 | 0.62 | 185–188 |
| (54) | 729 | 0.63 | 174–189 |
| (55) | 725 | 0.73 | 214–217 |
| (56) | 723 | 0.59 | 170–176 |
| (57) | 760 | 0.88 | >300 |
| (60) | 580 | 0.44 | 254–260 |
| (70) | 830 | 1.94 | 233–236 |
| (71) | 828 | 1.64 | 251–255 |
| (76) | 830 | 2.00 | 259–263 |
| (103) | 930 | 2.75 | 208–212 |
| (108) | 860 | 1.60 (DMF) | 223–226 |
| (113) | 770 | 1.56 | 258–270 |
| (114) | 766 | 1.60 | >300 |
| (115) | 768 | 1.67 | 233–237 |
| (116) | 765 | 1.47 | 188–191 |
| (117) | 764 | 1.54 | 273–277 |
| (118) | 782 | 1.44 | >300 |
| (137) | 680 | 1.25 | >300 |
| (147) | 844 | 0.92 | 245–250 |

(Unless otherwise indicated, the values of $\lambda_{max}$ and $\epsilon_{max}$ are those measured in $CH_2Cl_2$.)

The metal complexes of the aforesaid formulae (I), (II) and (III) including the compounds exemplified above can be produced by the methods shown in the production Examples mentioned below or by using analogous methods.

The organic base substances for use in the present invention include any and all dyes which possess a dyeing or coloring potency, for example, water-soluble dyes such as basic dyes, acidic dyes, direct dyes, soluble vat dyes and mordant dyes; insoluble dyes such as sulfur dyes, vat dyes, oil-soluble dyes, disperse dyes, azoic dyes and oxidation dyes, as well as reactive dyes. These organic base substances include not only dyes which can be seen colored under irradiation of sun light but also colorless or pale yellow fluorescent whitening (brightening) dyes.

Among these said dyes, those which are preferably used in the present invention are, from the standpoint of chemical structural classification of dyes, quinoneimine dyes (e.g., azine dyes, oxazine dyes, thiazine dyes), methine and polymethine dyes (e.g., cyanine dyes, azomethine dyes), azo dyes, anthraquinone dyes, indoamine and indophenol dyes, indigoid dyes, carbonium dyes, formazane dyes and pyrazoloazole dyes.

The organic base substances for the present invention include any and all polymer compounds, such as polyolefins, polyamides, polydiene, polyvinyl chlorides, polyacrylic acids, polystyrenes, polyvinyl alcohols, polyesters, polyethers, polyurethanes, polyacetals, polycarbonates and polyphenyleneoxides.

Among the polymer compounds, those which are preferably used in the present invention are polyolefins, polydienes and polystyrenes.

The organic base substances for the present invention include image-forming dyes which are used in the field of photography, such as dyes formed from color couplers, DRR compounds, DRR couplers, amidorazone compounds or color-developing agents as well as dyes for the silver dye-bleaching process.

Dyes which are preferably used as the organic base substance for the present invention are anthraquinone dyes, quinoneimine dyes, azo dyes, methine dyes, polymethine dyes, indoamine dyes, indophenol dyes, formazane dyes and pyrazoloazole dyes. Dyes which are most preferably used for carrying out the present invention are methine dyes, polymethine dyes, indoamine dyes, indophenol dyes and pyrazoloazole dyes. The methine and polymethine dyes and indoamine and indophenol dyes include compounds having the following group:

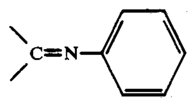

in which the phenyl group may be an unsubstituted phenyl group or a substituted phenyl group, for example, a phenyl group substituted by an alkyl group, an alkoxy group, a halogen atom and/or an amino group.

Dye-forming couplers which are preferred for use in the present invention include yellow, magenta and cyan dye-forming couplers. The couplers may be the so-called 4-equivalent type couplers or 2-equivalent type couplers, for example, those described in U.S. Pat. Nos. 3,277,155 and 3,458,315.

Yellow dye-forming couplers generally contain at least one carbonyl-activated methylene group (e.g., ring-opened ketomethylene) and include $\beta$-diketones and $\beta$-ketoacylamides, for example, benzoylacetanilides and $\alpha$-pivalylacetanilides.

Examples of the yellow dye-forming couplers for use in the present invention are described in, for example, U.S. Pat. Nos. 2,875,057, 3,265,506, 3,408,194, 3,551,155, 3,582,322, 3,725,072 and 3,891,445, West German Pat. No. 1,547,868, West german Patent Application (OLS) Nos. 2,213,461, 2,219,917, 2,261,361, 2,263,875 and 2,414,006, British Pat. Nos. 1,421,123, 1,421,126 and 1,425,020, JP-B-51-10783, JP-A-51-102636, JP-A-50-6341, JP-A-50-123342, JP-A-50-130442, JP-A-51-21827 and JP-A-50-87650 (the term "JP-A" as used herein means an "unexamined published Japanese patent application".)

Magenta dye forming couplers, for example, 5-pyrazolone type couplers may be used in the present invention.

Examples of the magenta dye-forming couplers which may be used in the present invention are described in, for example, U.S. Pat. Nos. 2,600,788, 2,983,608, 3,062,653, 3,127,269, 3,331,476, 3,419,391, 3,519,429, 3,558,319, 3,582,322, 3,615,506, 3,834,908, 3,891,445, 3,725,067 and 4,540,654, West German Pat. No. 1,810,464, West German Patent Application (OLS) Nos. 2,408,665, 2,417,945, 2,418,959 and 2,424,467, JP-B-40-6031 and JP-B-51-45990, JP-A-50-159336, JP-A-52-42121, JP-A-49-74028, JP-A-50-60233, JP-A-51-26541 and JP-A-59-171956.

As other magenta dye-forming couplers for use in the present invention, there may be mentioned, for example, the indazolones described by Vittum and Weissberger, in *Journal of Photographic Science*, Vol. 6 (1958), page 158 and below, the pyrazolinobenzimidazoles described in U.S. Pat. No. 3,061,432, the pyrazolo-s-triazoles described in Belgian Pat. No. 724,427, and the 2-cyanoacetylcumarones described in U.S. Pat. No. 2,115,394.

Cyan dye-forming couplers which may be used in the present invention include phenol compounds and u-naphthol compounds.

Examples of the cyan dye-forming couplers for use in the present invention are described in, for example, U.S. Pat. Nos. 2,369,929, 2,434,272, 2,474,293, 2,521,908, 2,895,826, 3,034,892, 3,311,476, 3,458,315, 3,476,563, 3,583,971, 3,591,383, 3,767,411 and 4,004,929, West German Patent Application (OLS) Nos. 2,414,830 and 2,454,329, JP-A-48-59838, JP-A-51-26034, JP-A-48-5055 and JP-A-51-146828.

In addition, the colored couplers described in U.S. Pat. Nos. 3,476,560, 2,521,908 and 3,034,892, JP-B-44-2016, JP-B-38-22335, JP-B-42-11304 and JP-B-44-32461, JP-A-51-26034 and JP-A-52-42121, West German Patent Application (OLS) No. 2,418,959; and the DIR couplers described in U.S. Pat. Nos. 3,227,554, 3,614,291, 3,701,783, 3,790,384 and 3,632,345, West German Patent Application (OLS) Nos. 2,414,006, 2,454,301 and 2,454,329, British Patent No. 953,454, JP-A-52-69624, JP-A-49-122335 and JP-A-52-69624, and JP-B-51-16141 may also be used in the present invention.

General types of these couplers are further described in, for example, Kirk-Othmer, *Encyclopedia of Chemical Technology*, Vol. 5, pages 822 to 825, and Glafkides, *Photographic Chemistry*, Vol. 2, pages 596 to 614.

As mentioned above, when these couplers are used in practice of the present invention, the coupler is reacted with an oxidized aromatic primary amine silver halide-developing agent to form a dye.

The developing agent includes aminophenols and phenylenediamines, and these developing agents can be used in combination.

Specific examples of the developing agents which may be reacted with various couplers to form various base compounds are the p-phenylenediamine and derivatives thereof described in T. H. James, *The Theory of the Photographic Process* (4th Ed.) (published by Macmillan Co., 1977), pages 315 to 320. Above all, p-phenylenediamines in which at least one amino group is substituted by a lower alkyl group having from 1 to 3 carbon atoms or its derivative, for example, p-phenylenediamine derivatives of 4-amino-N,N-dimethylaniline, 4-amino-N,N-diethylaniline, 4-amino-3-methyl-N,N-diethylaniline, 4-amino-3-methyl-N-ethyl-N-($\beta$-methanesulfonamidoethyl)aniline, 4-amino-N-ethyl-N-($\beta$-hydroxyethyl)aniline and 4-amino-3-methyl-N-ethyl-N-($\beta$-hydroxyethyl)aniline are preferably used in the present invention.

Among the couplers which may form base compounds by reaction with the above-mentioned or other developing agents, those which are preferably used in the present invention are represented by the following general formulae (IV), (V), (VI) and (VII):

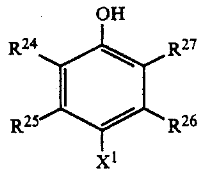
(IV)

where $R^{24}$, $R^{25}$, $R^{26}$ and $R^{27}$ each represents a hydrogen atom, a halogen atom (e.g., fluorine, chlorine, bromine, iodine), an alkyl group (e.g., methyl, ethyl octyl, dodecyl, tetradecyl, octadecyl), a carbamoyl group (e.g., methylcarbamoyl, ethylcarbamoyl, dodecylcarbamoyl, tetradecylcarbamoyl, octadecylcarbamoyl, N-phenylcarbamoyl, N-tolylcarbamoyl) a sulfamoyl group (e.g., methylsulfamoyl, ethylsulfamoyl, dodecylsulfamoyl, tetradecylsulfamoyl, octadecylsulfamoyl, N-phenyl-sulfamoyl, N-tolylsulfamoyl), or an amido group (e.g., acetamido, propionamido, benzamido, phenacetamido, sulfonamido, phosphoric acid amide, ureido);

$R^{24}$ and $R^{25}$ may be bonded together to form a 6-membered ring (e.g., phenyl); and $X_1$ represents a hydrogen atom, a halogen atom (e.g., fluorine, chlorine, bromine, iodine) or a group capable of being released by reaction with the oxidation product of a developing agent (e.g., alkoxy, aryloxy, sulfonamido, sulfonyl, carbamoyl, imido, aminosulfonyl, alkylcarbonyloxy, arylcarbonyloxy, alkylthio, arylthio or heterocyclicthio group).

The alkyl group, carbamoyl group, sulfamoyl group or amido group for $R^{24}$, $R^{25}$, $R^{26}$ or $R^{27}$,or the 6-membered ring formed by $R^{24}$ and $R^{25}$ may optionally be substituted by one or more other substituents, such as an alkyl group (e.g., methyl, ethyl, propyl, octyl, dodecyl, tetradecyl, octadecyl), an aryl group (e.g., phenyl, tolyl, naphthyl), an aryloxy group (e.g., phenoxy, 2,5-di-tert-amylphenoxy) and/or a halogen atom (e.g., chlorine, bromine, fluorine).

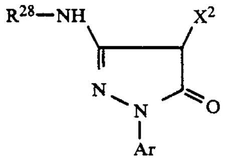
(V)

where $R^{28}$ represents an alkyl group, an aryl group, an acyl group or a carbamoyl group;

Ar represents an unsubstituted phenyl group, or a phenyl group substituted by one or more substituents selected from a halogen atom, an alkyl group, a cyano group, an alkoxy group, an alkoxycarbonyl group and an acylamino group;

$X^2$ represents a hydrogen atom or a group capable of being released by reaction with the oxidation product of an aromatic primary amine color developing agent.

In the formula (V), the alkyl group for $R^{28}$ is an alkyl group having from 1 to 42 carbon atoms, and this includes, for example, methyl, butyl, octadecyl and 2-(2,4-di-tert-amylphenoxy)ethyl groups. The aryl group for $R^{28}$ includes, for example, phenyl, 2-chlorophenyl, 2-chloro-5-tetradecanephenyl, 2-chloro-5-(3-octadecenyl-N-succinimido)phenyl, 2,4-dichloro-5-dodecyloxyphenyl and 2-chloro-5-octadecylthiophenyl groups. The acyl group for $R^{28}$ includes, for example, acetyl, 2-ethylhexanoyl, α-(2,4-di-tert-pentylphenoxy)acetyl, α-(2,4-di-tert-pentylphenoxy)butanoyl, γ-(2,4-di-tert-pentyl)butanoyl and α-(3-pentadecylphenoxy)butanoyl groups. The carbamoyl group for $R^{28}$ includes, for example, N-methylcarbamoyl, N,N-dimethylcarbamoyl, N-hexadecylcarbamoyl, N-methyl-N-phenylcarbamoyl and N-{3-[α-(2,4-di-tert-pentylphenoxy)butylamide]} phenyl groups.

The group Ar includes, for example, phenyl, 2,4,6-trichlorophenyl, 2,5-dichlorophenyl, 2,4-dimethyl-6-methoxyphenyl, 2,6-dichloro-4-methoxyphenyl, 2,6-dichloro4-ethoxycarbonylphenyl, 2,6-dichloro-4-cyanophenyl and 4-(α-(2,4-di-tert-amylphenoxy)butylamide) phenyl groups.

In the formula (V), $X^2$ represents a hydrogen atom or a coupling-releasing group, and examples of the group include a halogen atom (e.g., fluorine, chlorine, bromine), an alkoxy group (e.g., dodecyloxy, dodecyloxycarbonylmethoxy, methoxycarbamoylmethoxy, carboxypropyloxy, methanesulfonyloxy), an aryloxy group (e.g., 4-methylphenoxy, 4-tert-butylphenoxy, 4-methoxyphenoxy, 4-methanesulfonylphenoxy, 4-(4-benzyloxy-phenylsulfonyl)phenoxy), an acyloxy group (e.g., acetoxy, tetradecanoyloxy, benzoyloxy), a sulfonyloxy group (e.g., methanesulfonyloxy, toluenesulfonyloxy), an amido group (e.g., dichloroacetylamino, methanesulfonylamino, triphenylphosphonamido), an alkoxycarbonyloxy group (e.g., ethoxycarbonyloxy, benzyloxycarbonyloxy), an aryloxycarbonyloxy group (e.g., phenoxycarbonyloxy), an aliphatic- or aromatic-thio group (e.g., phenylthio, dodecylthio, benzylthio, 2-butoxy-5-tert-octylphenylthio, 2,5-di-octyloxyphenylthio, 2-(2-ethoxyethoxy)-5-tert-octylphenylthio, tetrazolylthio), an imido group (e.g., succinimido, hydantoinyl, 2,4-dioxooxazolidin-3-yl, 3-benzyl-4-ethoxyhydantoin-1-yl), an N-heterocyclic group (e.g., 1-pyrazolyl, 1-benzotriazolyl, 5-chloro-1,2,4-triazol-1-yl), and an aromatic azo group (e.g., phenylazo). The releasing groups may optionally contain a photographically useful group.

The formula (V) may form a dimer or a higher polymer at the position of $R^{28}$,Ar or $X^2$.

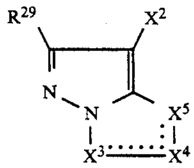
(VI)

in which $R^{29}$ represents a hydrogen atom or a substituent; $X^2$ represents a hydrogen atom or a group capable of being released by reaction with the oxidation product or an aromatic primary amine color developing agent; and $X^3$,$X^4$ and $X^5$ each represents

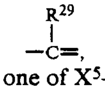

—N=or=NH=, and one of $X^5$—$X^4$ bond and $X^4$—$X^3$ bond is a double bond and the other is a single bond, and when $X^4$—$X^3$ bond is a carboncarbon double bond, the bond may be a part of an aromatic ring.

In the formula (VI), $R^{29}$ represents a hydrogen atom, a halogen atom, an alkyl group, an aryl group, a heterocyclic group, a cyano group, an alkoxy group, an aryloxy group, a heterocyclic-oxy group, an acyloxy group, a carbamoyloxy group, a silyloxy group, a sulfonyloxy group, an acylamino group, an anilino group, an ureido group, an imido group, a sulfamoylamino group, a carbamoylamino group, an alkylthio group, an arylthio group, a heterocyclic-thio group, an alkoxycarbonylamino group, an aryloxycarbonylamino group, a sulfonamido group, a carbamoyl group, an acyl group, a sulfamoyl group, a sulfonyl group, a sulfinyl group, an alkoxycarbonyl group, or an aryloxycarbonyl group.

More precisely, $R^{29}$ represents a hydrogen atom, a halogen atom (e.g., chlorine, bromine), an alkyl group (e.g., methyl, propyl, tert-butyl, trifluoromethyl, tridecyl, 3-(2,4-di-tert-amylphenoxy)propyl, allyl, 2-dodecyloxyethyl, 3-phenoxypropyl, 2-hexylsulfonylethyl, cyclopentyl, benzyl), an aryl group (e.g., phenyl, 4-tert-butylphenyl, 2,4-di-tert-amylphenyl, 4-tetradecanamidophenyl), a heterocyclic group (e.g., 2-furyl, 2-thienyl, 2-pyrimidinyl, 2-benzothiazolyl), a cyano group, an alkoxy group (e.g., methoxy, ethoxy, 2-methoxyethoxy, 2-dodecyloxyethoxy, 2-methanesulfonylethoxy), an aryloxy group (e.g., phenoxy, 2-methylphenoxy, 4-tert-butylphenoxy), a heterocyclic-oxy group (e.g., 2-benzimidazolyloxy) , an acyloxy group (e.g., acetoxy, hexadecanoyloxy) , a carbamoyloxy group [e.g., N-phenylcarbamoyloxy, N-ethylcarbamoyloxy), a silyloxy group (e.g., trimethylsilyloxy), a sulfonyloxy group (e.g., dodecylsulfonyloxy) , an acylamino group (e.g., acetamido, benzamido, tetradecanamido, α-(2,4-di-tert-amylphenoxy)-butylamido, γ-(3-tert-butyl-4-hydroxyphenoxy)-butylamido, α{4-(4-hydroxy-phenylsulfonyl)phenoxy} decanamido), an aniline group (e.g., phenylamino, 2-chloroanilino, 2-chloro-5-tetradecanamidoaniline, 2-chloro-5-dodecyloxycarbonyl-aniline, N-acetylanilino, 2-chloro-5-{3-(α-tert-butyl-4-hydroxyphenoxy)-dodecanamido}anilino), an ureido group (e.g., phenylureido, methylureido, N,N dibutylureido), an imido group (e.g., N-succinimido, 3-benzylhydantoinyl, 4-(2-ethylhexanoylamino)phthalimido), a sulfamoylamino group (e.g., N,N-dipropylsulfamoylamino, N-methyl-N-decylsulfamoylamino), an alkylthio group (e.g., methylthio, octylthio, tetradecylthio, 2-phenoxyethylthio, 3-phenoxypropylthio, 3-(4-tert-butylphenoxy)propylthio), an arylthio group (e.g., phenylthio, 2-butoxy-5-tert-octylphenylthio, 3-pentadecylphenylthio, 2-carboxy-phenylthio, 4-tetradecanamidophenylthio), a heterocyclic-thio group (e.g., 2-benzothiazolylthio), an alkoxycarbonylamino group (e.g., methoxycarbonylamino, tetradecyloxycarbonylamino), an aryloxycarbonylamino group (e.g., phenoxycarbonylamino, 2,4-di-tert-butylphenoxy-carbonylamino), a sulfonamido group (e.g., methanesulfonamido, hexadecanesulfonamido, benzenesulfonamido, p-toluenesulfonamido, octadecanesulfonamido, 2-methyloxy-5-tert-butylbenzenesulfonamido), a carbamoyl group (e.g., N-ethylcarbamoyl, N,N-dibutyl carbamoyl, N-(2-dodecyloxyethyl)carbamoyl, N-methyl-N-dodecylcarbamoyl, N-{3-(2,4-di-tert-amylphenoxy)propyl}-carbamoyl), an acyl group (e.g., acetyl, (2,4-d-tert-amylphenoxy)acetyl, benzoyl), a sulfamoyl group (e.g., N-ethylsulfamoyl, N,N-dipropylsulfamoyl, N-(2-dodecyloxyethyl)sulfamoyl, N-ethyl-N-dodecylsulfamoyl, N,N-diethylsulfamoyl, a sulfonyl group (e.g., methanesulfonyl, octanesulfonyl, benzenesulfonyl, toluenesulfonyl, 2-butoxy-5-tert-cotyl-phenylsulfonyl), a sulfinyl group (e.g., octanesulfinyl, dodecylsulfinyl, phenylsulfinyl), an alkoxycarbonyl group (e.g., methoxycarbonyl, butyloxycarbonyl, dodecylcarbonyl, octadecylcarbonyl), or an aryloxycarbonyl (e.g., phenyloxycarbonyl, 3-pentadecyloxycarbonyl).

In the formula (VI), X2 represents a hydrogen atom or a group capable of being released by reaction with the oxidation product of an aromatic primary amine color developing agent, and the details of $X^2$ are the same as those mentioned for the formula (V) above.

The formula (VI) may form a dimer or a higher polymer at the position of the group $R^{29}$ or $X^2$.

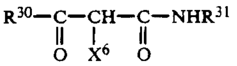

(VII)

in which $R^{30}$ represents an alkyl group (e.g., methyl, ethyl tert-butyl, tert-octyl) or an aryl group (e.g., phenyl);

$R^{31}$ represents an aryl group (e.g., phenyl); and $X^6$ represents a hydrogen atom, a halogen atom (e.g., chlorine, bromine), or a group capable of being released by reaction with the oxidation product of a developing agent, such as a heterocyclic group (e.g., naphtoimido, succinimido, 5,5-dimethylhydantoinyl, 2,4-oxazolidinedione, imido, pyridone, pyridazone), an acyloxy group, a sulfonyloxy group, an aryloxy group or an urethane group.

The alkyl group or aryl group for $R^{30}$ and the ary group for $R^{31}$ may optionally be substituted by one or more other substituents, for example, selected from an alkyl group, an aryl group, an alkoxy group, an aryloxy group, an amido group, an N-alkycarbamoyl group, an N-alkylsulfamoyl group, an acyloxy group, a carboxyl group, a sulfo group, a sulfonamido group and a halogen atom.

Examples of couplers which may form base compounds, especially organic dyes, in accordance with the present invention, include the following compounds:

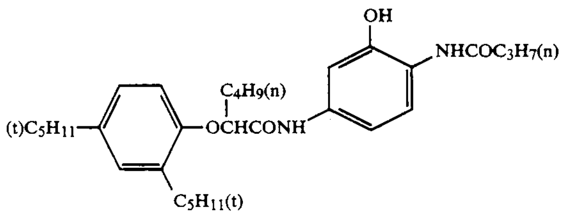

(IV-1)

-continued
(IV-2)
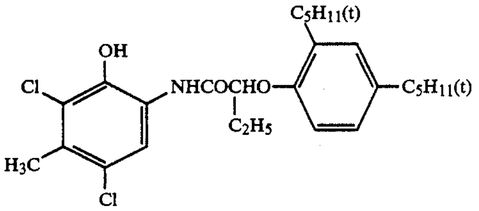
(IV-3)
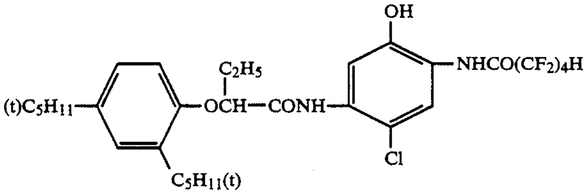
(IV-4)
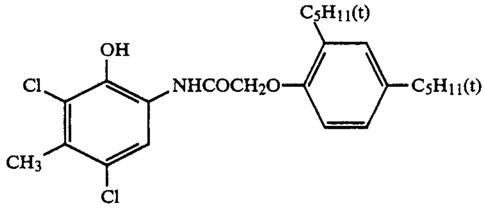
(IV-5)
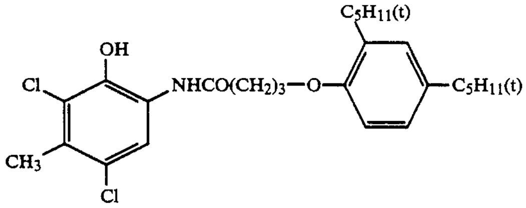
(IV-6)
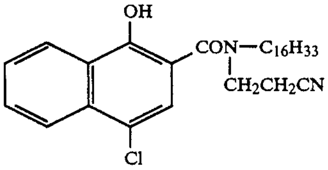
(IV-7)
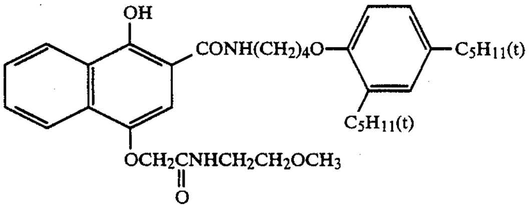
(IV-8)
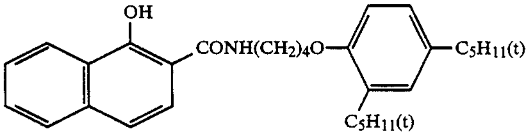
(IV-9)
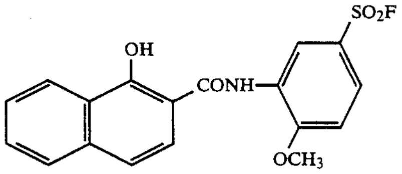

-continued
(V-1)
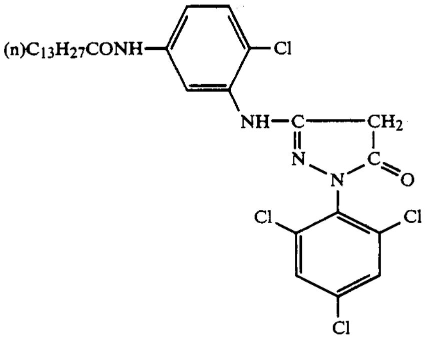
(V-2)
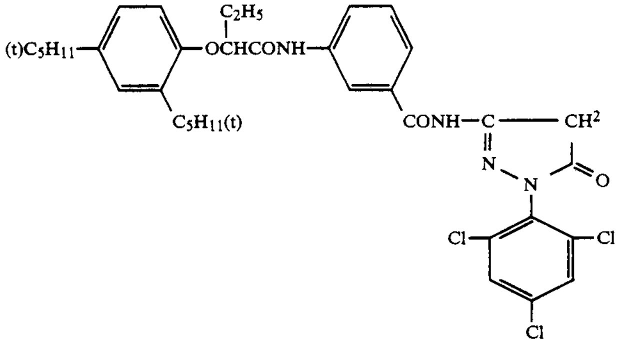
(V-3)
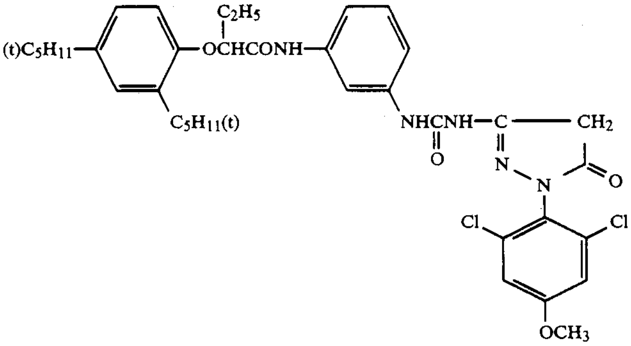
(V-4)
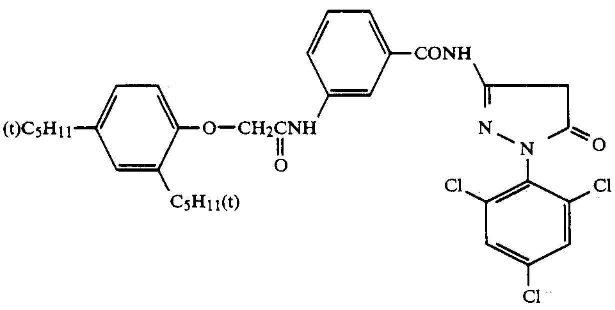

-continued
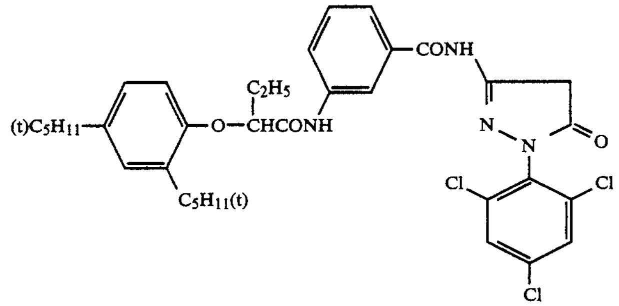
(V-5)
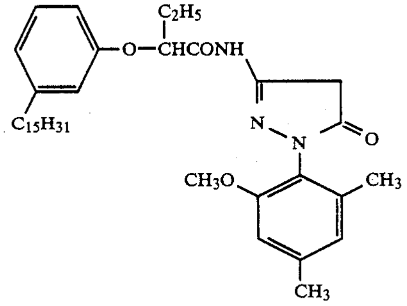
(V-6)
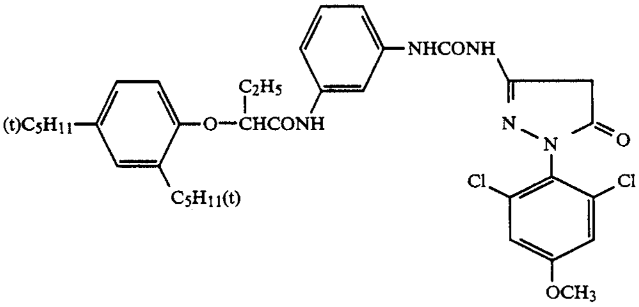
(V-7)
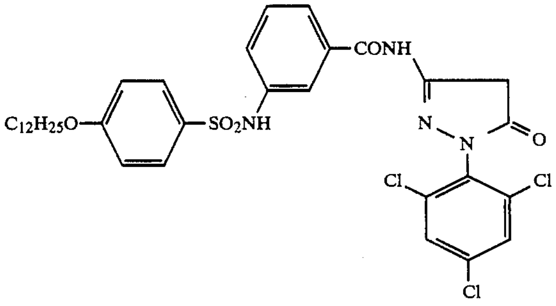
(V-8)
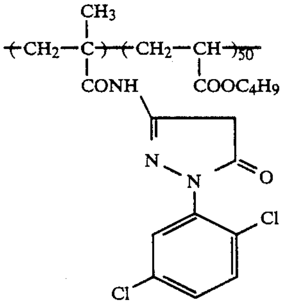
(V-9)

-continued
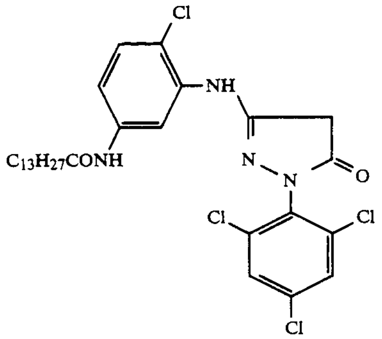
(V-10)
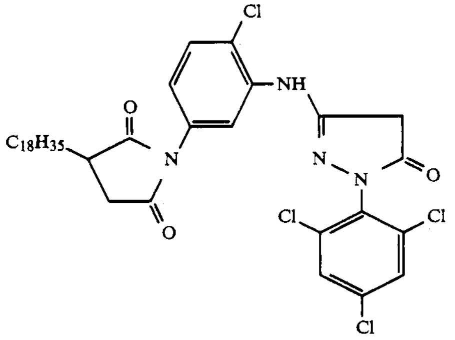
(V-11)
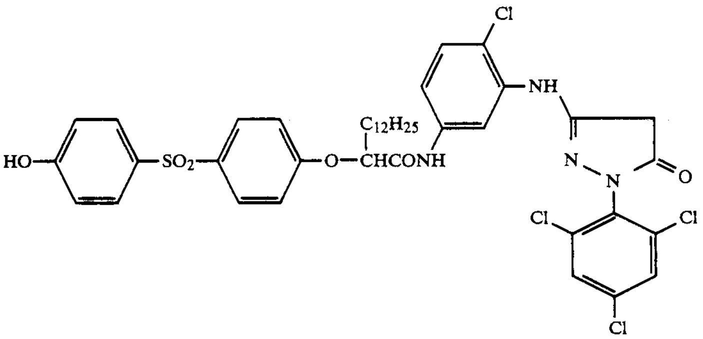
(V-12)
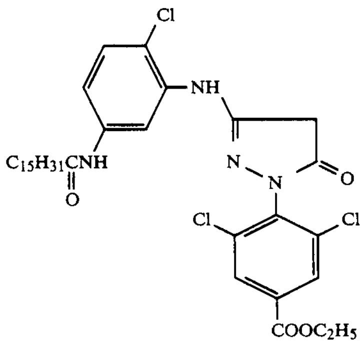
(V-13)

-continued
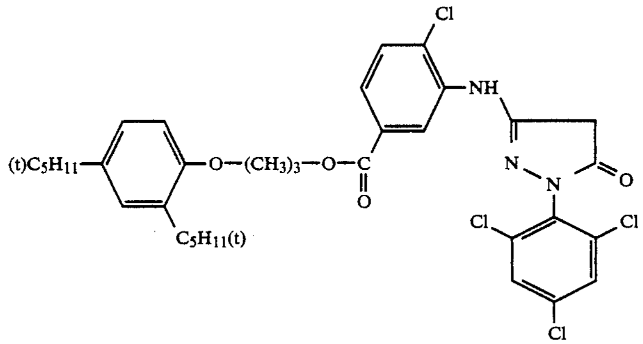
(V-14)
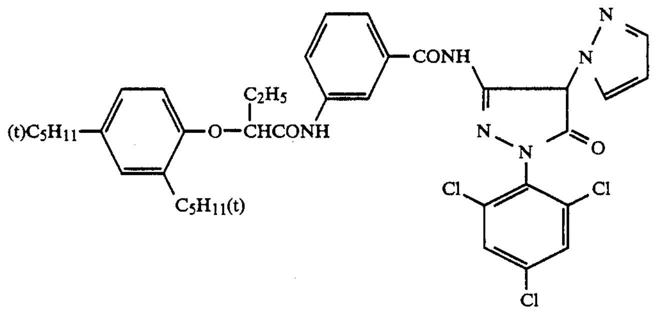
(V-15)
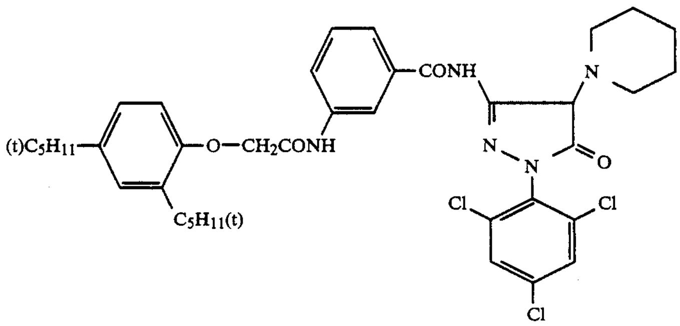
(V-16)
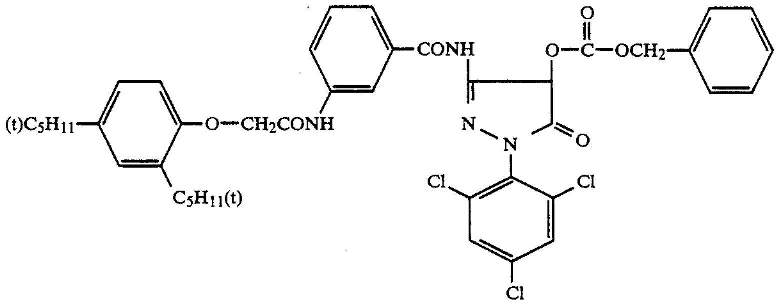
(V-17)
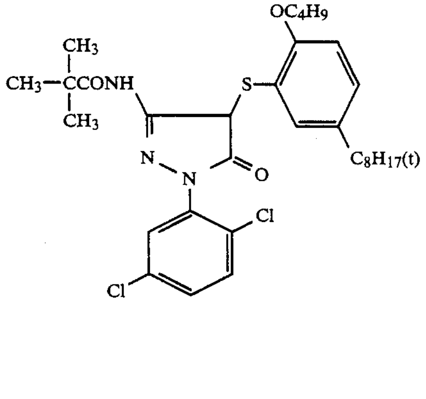
(V-18)

-continued
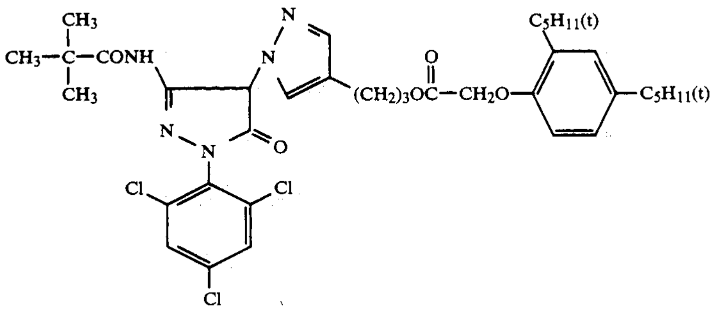
(V-19)
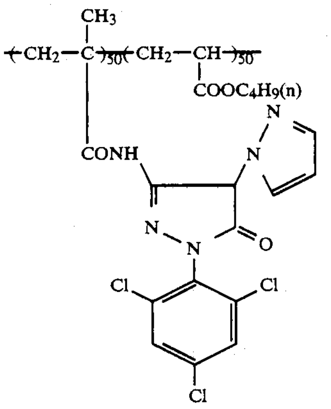
(V-20)
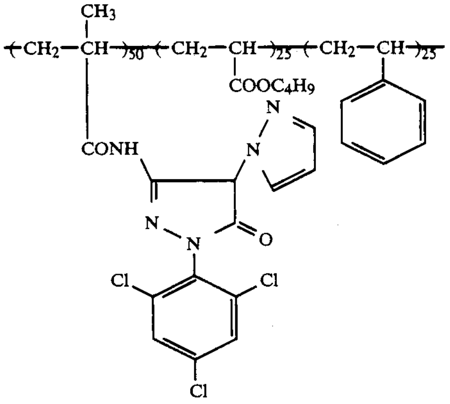
(V-21)
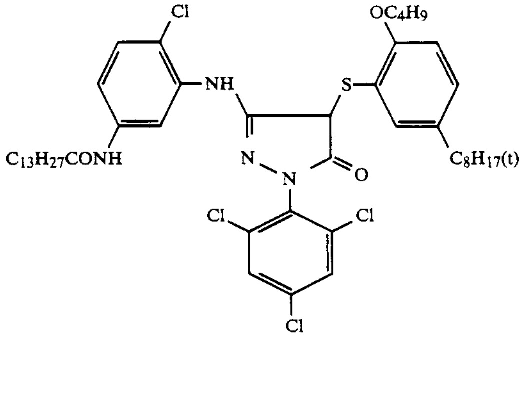
(V-22)

-continued
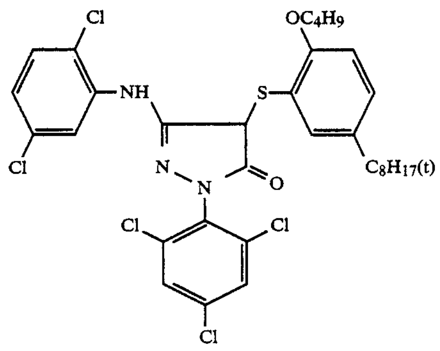
(V-23)
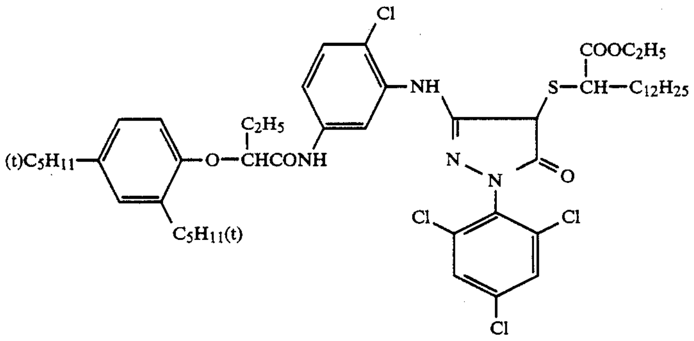
(V-24)
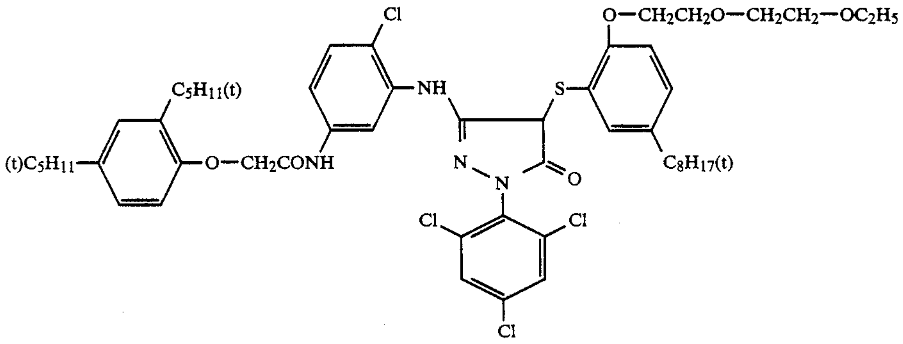
(V-25)
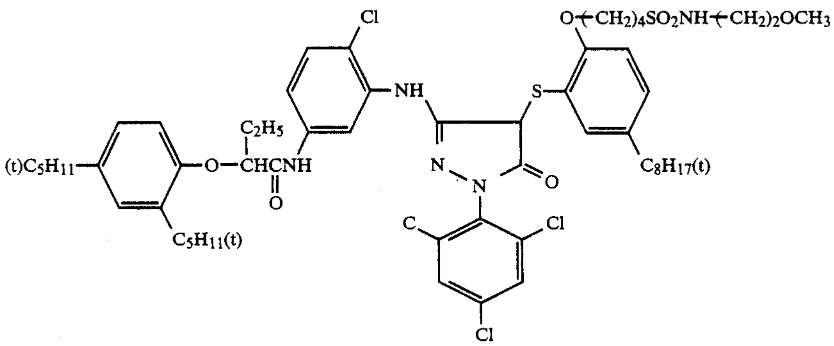
(V-26)

-continued
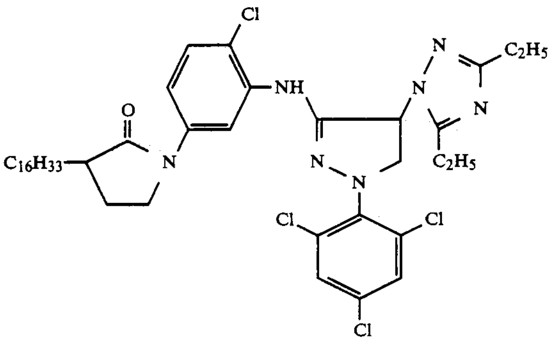
(V-27)
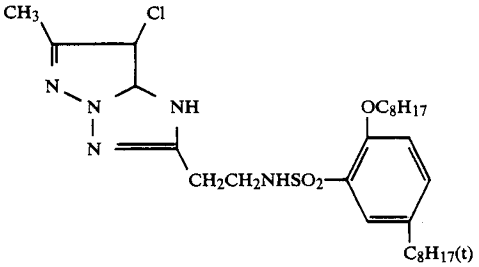
(VI-1)
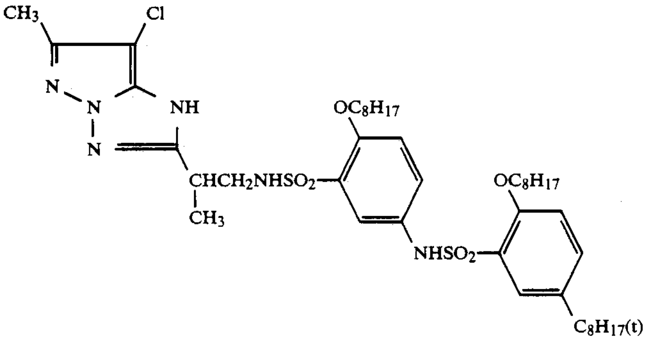
(VI-2)
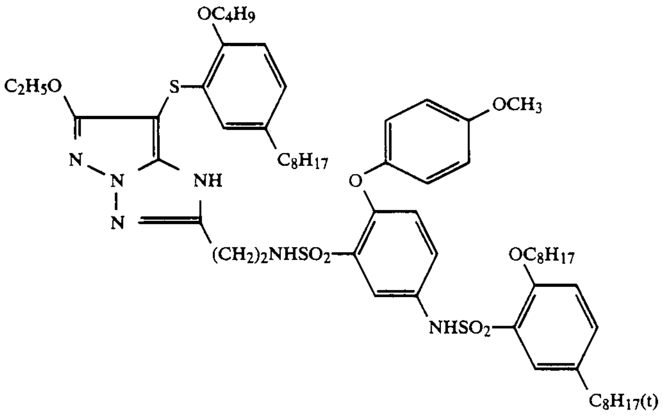
(VI-3)

-continued
(VI-4)
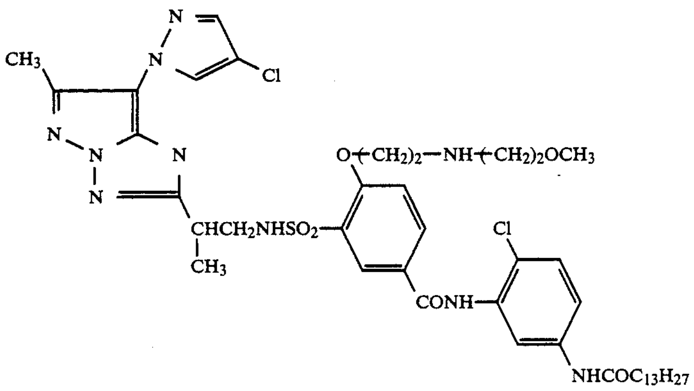
(VI-5)
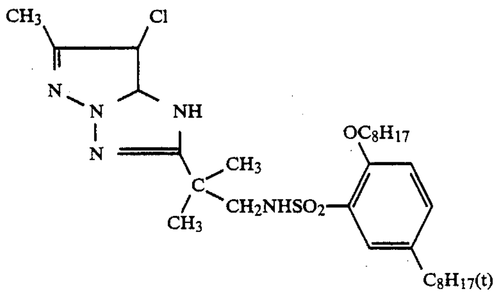
(VI-6)
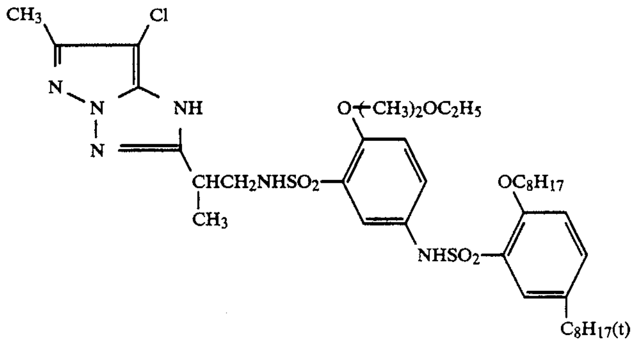
(VI-7)
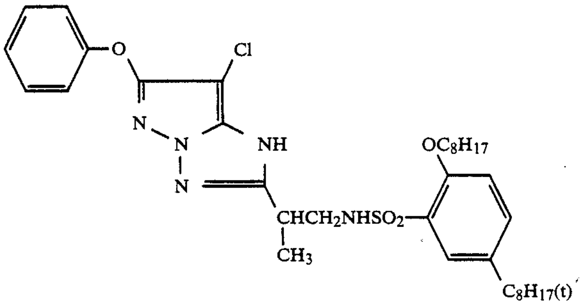
(VI-8)
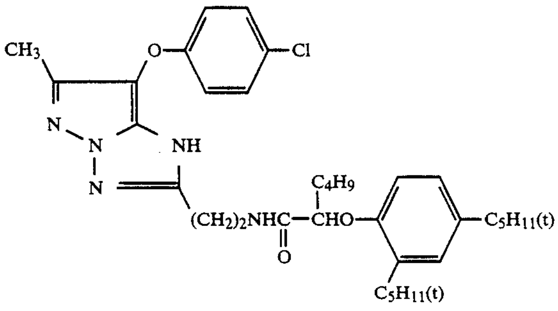

-continued
(VI-9)
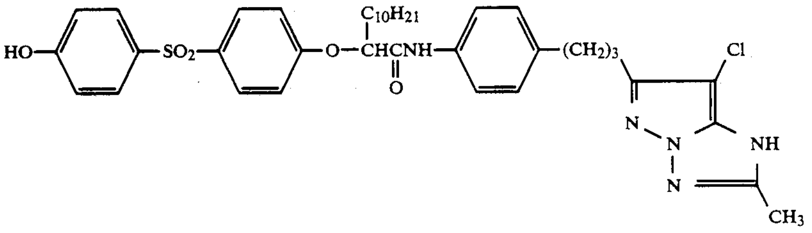
(VI-10)
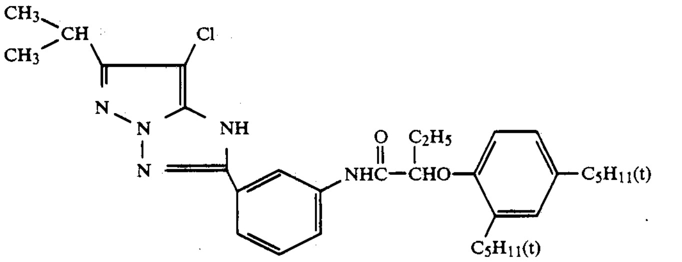
(VI-11)
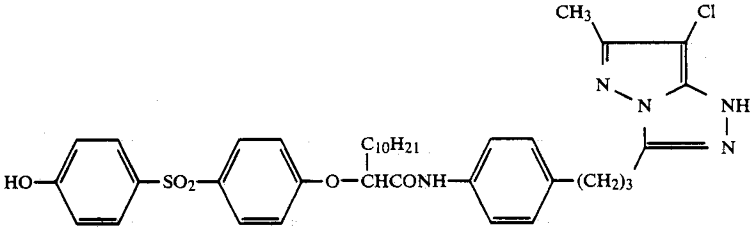
(VI-12)
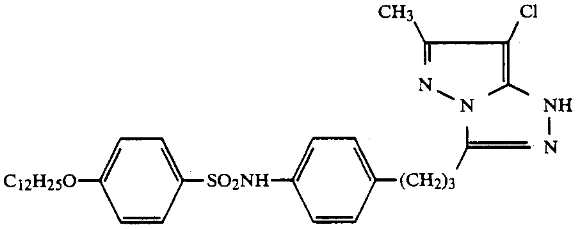
(VI-13)
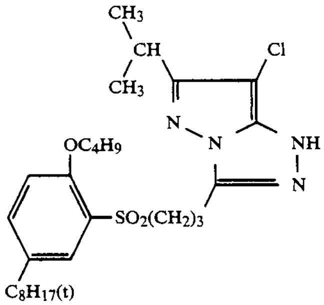
(VI-14)
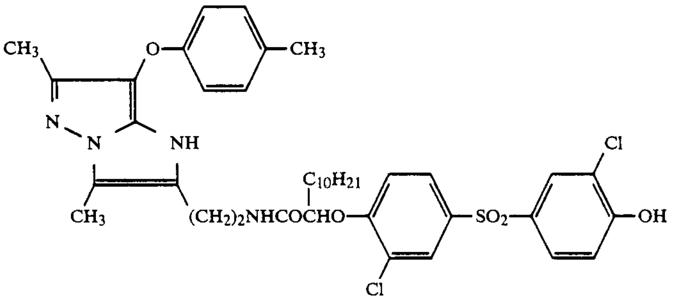

-continued
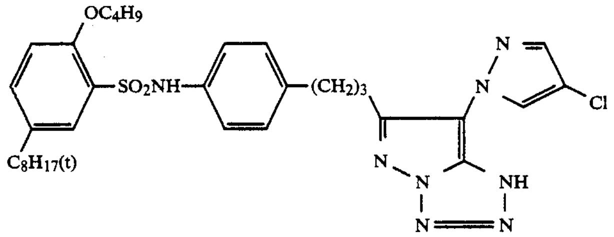
(VI-15)
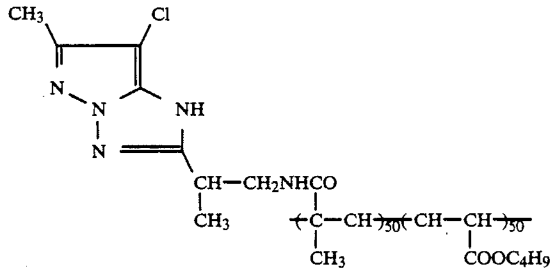
(VI-16)
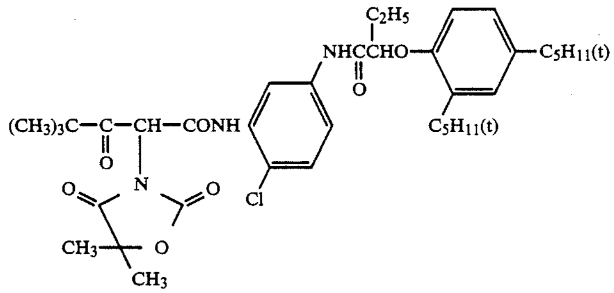
(VII-1)
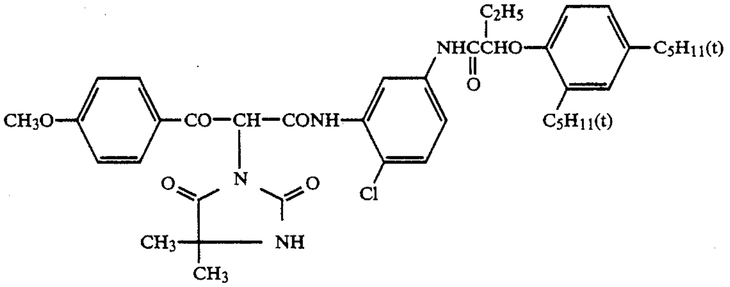
(VII-2)
Examples of other dyes which may be used as the base substances for the present invention include the following compounds:
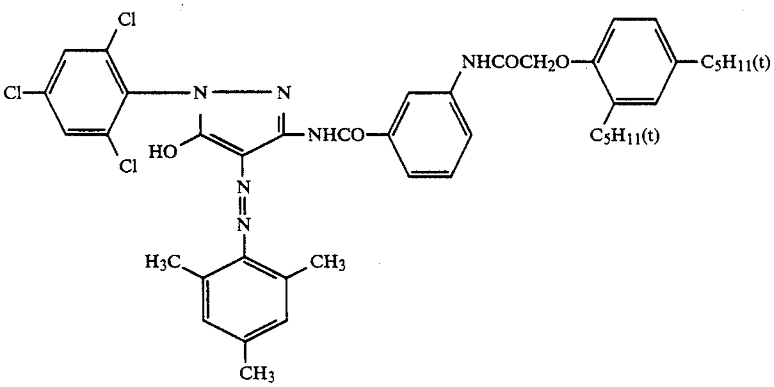
(VIII-1)

-continued
(VIII-2)
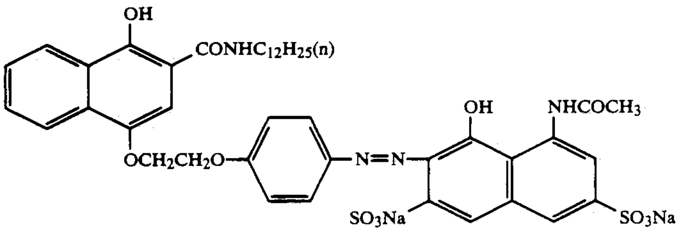
(VIII-3)
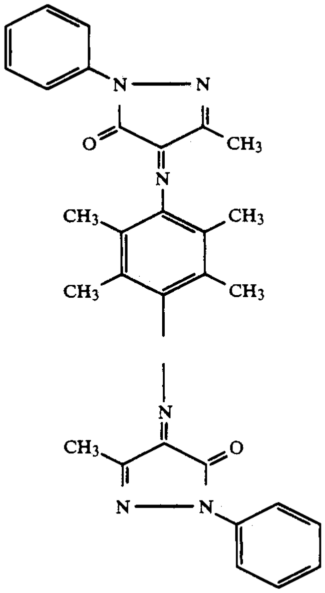
(VIII-4)
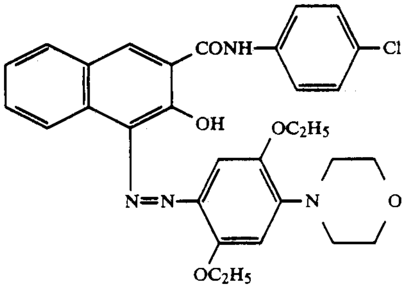
(VIII-5)
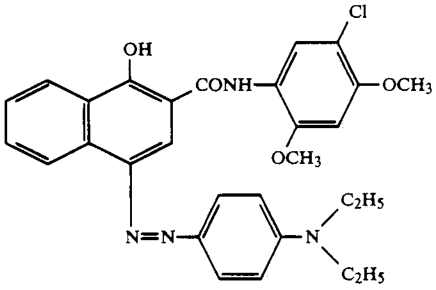
(VIII-6)
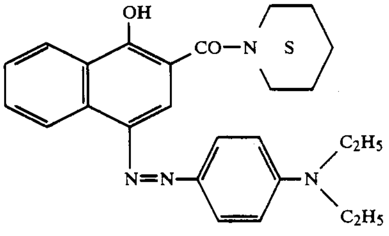

-continued
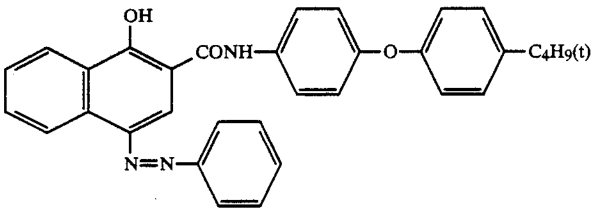
(VIII-7)
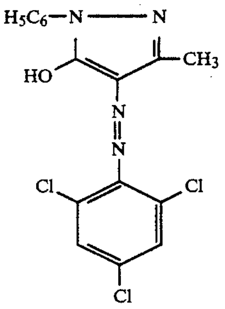
(VIII-8)
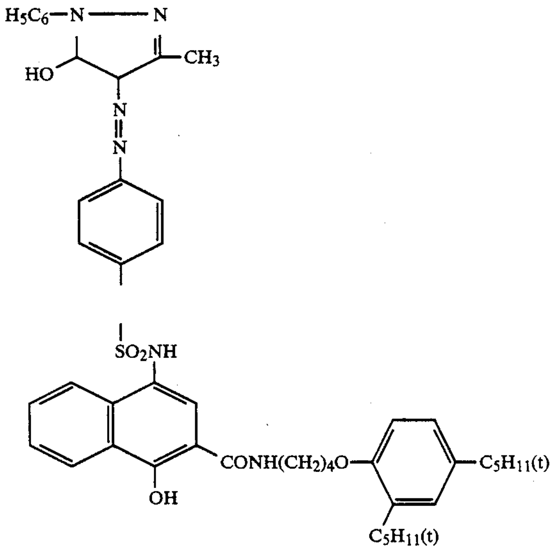
(VIII-9)
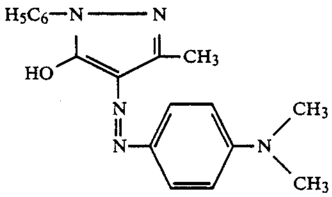
(VIII-10)
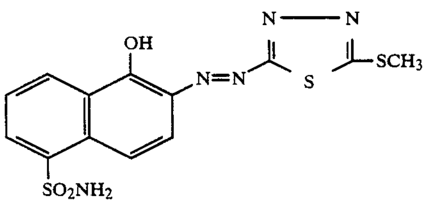
(VIII-11)

-continued
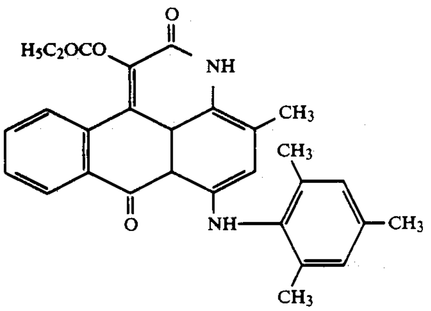
(VIII-12)
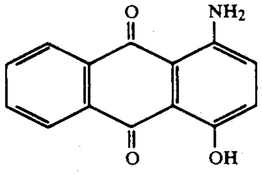
(VIII-13)
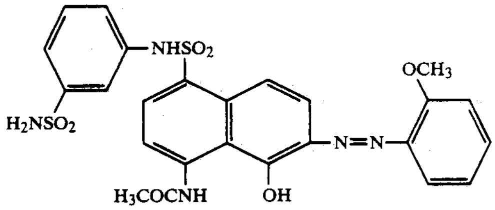
(VIII-14)
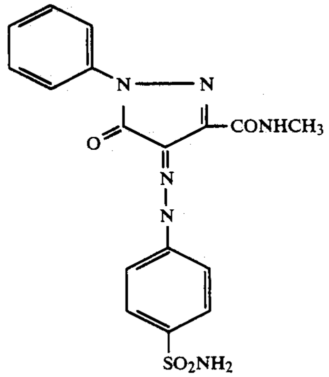
(VIII-15)
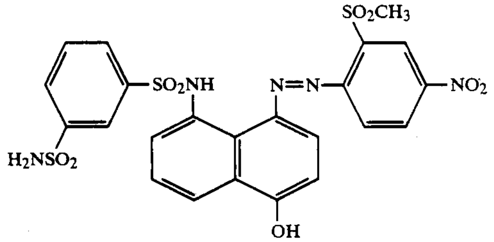
(VIII-16)
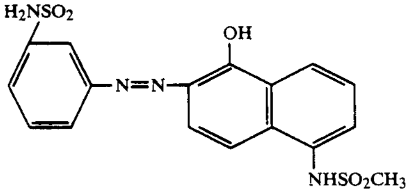
(VIII-17)

-continued
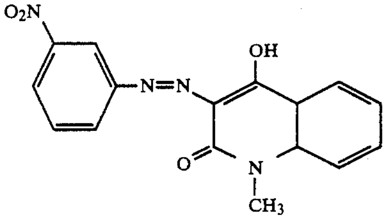
(VIII-18)
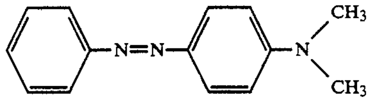
(VIII-19)
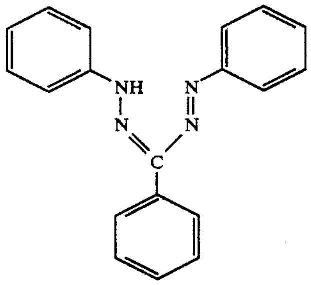
(VIII-20)
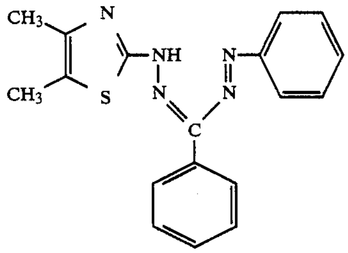
(VIII-21)
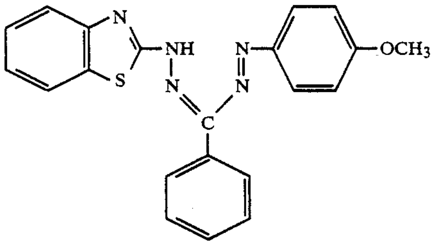
(VIII-22)
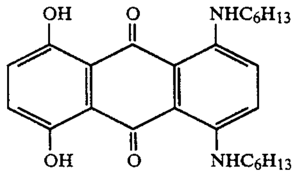
(VIII-23)
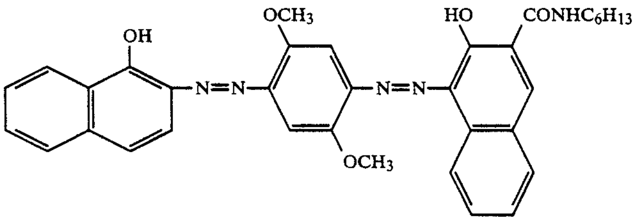
(VIII-24)

-continued
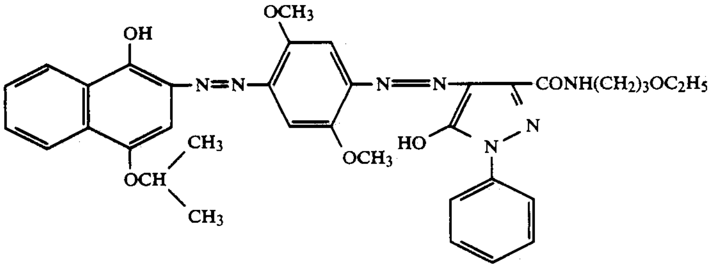
(VIII-25)
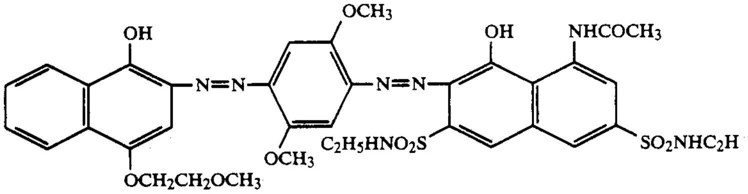
(VIII-26)
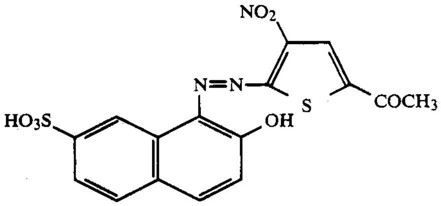
(VIII-27)
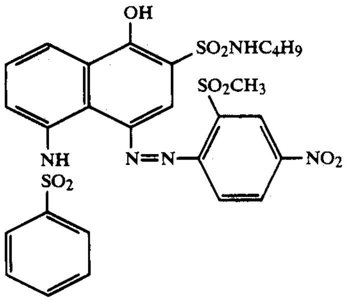
(VIII-28)
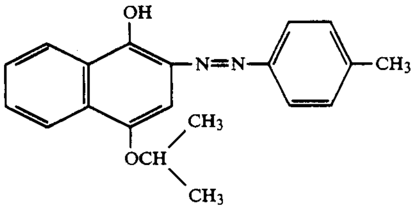
(VIII-29)
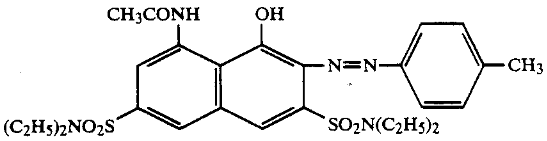
(VIII-30)
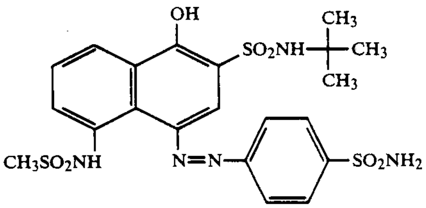
(VIII-31)

-continued
(VIII-32)
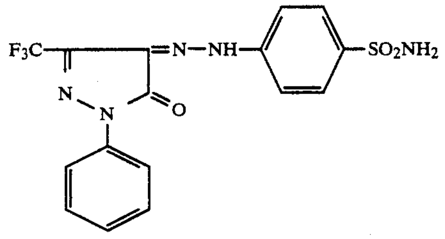
(VIII-33)
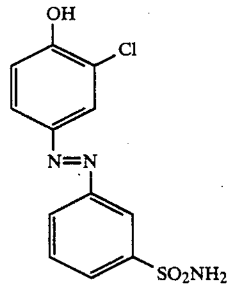
(VIII-34)
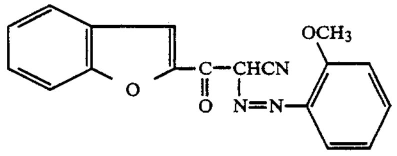
(VIII-35)
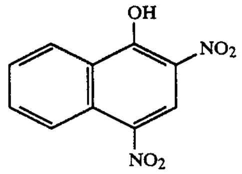
(VIII-36)
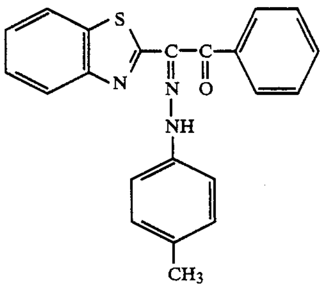
(VIII-37)
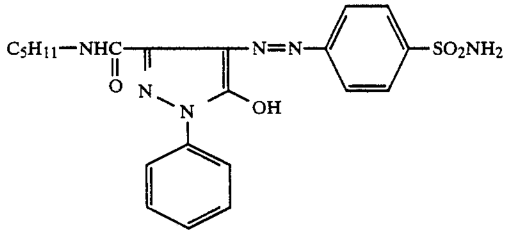

-continued

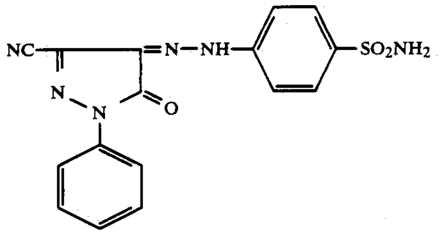

(VIII-38)

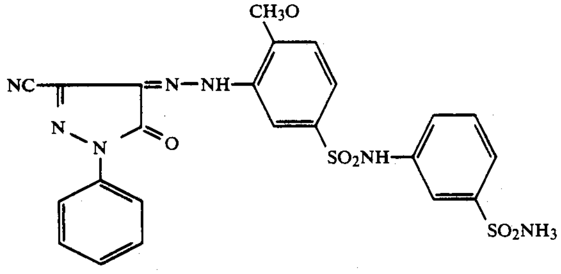

(VIII-39)

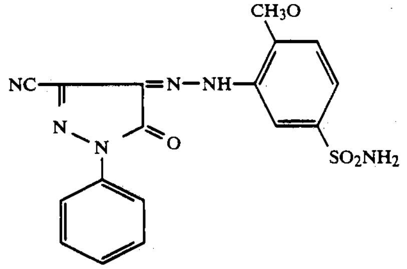

(VIII-40)

As dyes of other types which may preferably be used in the present invention, there are dyes to be formed by oxidation of the DRR compounds described in U.S.B. 351,673, U.S. Pat. Nos. 3,932,381, 3,928,312, 3,931,144, 3,954,476, 3,929,760, 3,942,987, 3,932,380, 4,013,635 and 4,013,633, JP-A-51-113624, JP-A-51-109928, JP-A-51-104343 JP-A-52-48819,and JP-A-53-149328, *Research Disclosure* (November, 1976), pages 68 to 74, and ibid., No. 13024 (1975).

As further dyes of other types which may also be used in the present invention, there are dyes as released by reaction of a DRR coupler and the oxidation product of a color developing agent or dyes as formed by reaction with the oxidation product of a color developing agent, for example, those described in British Pat. Nos. 840,781, 904,364, 932,272, 1,014,725, 1,038,331, 1,066,352 and 1,097,064, JP-A-51-133021, UST 900,029 (U.S. Defensive Publication) and U.S. Pat. No. 3,227,550.

As still further dyes of other types which may preferably be used in the present invention, there are the dye developers described in JP-B-35-182, JP-B-35-18332, JP-B-48-32130, JP-B-46-43950 and JP-B-49-2618.

As still further dyes of other types which may be used in the present invention, there are various kinds of dyes to be used in silver dye-bleaching process. As yellow dyes which may be used for that purpose, there may be mentioned azo dyes (e.g., Direct Fast Yellow CC (CI 29000), Chrysophenine (CI 24895), benzoquinone dyes (e.g., Indigo Golden Yellow ICK (CI 59101), Indigosol Yellow 2CB (CI 61726), Algol Yellow GCA-CF (CI 67301), Indanthrene Yellow GF (CI 68420), Mikethren Yellow GC (CI 67300), Indanthrene Yellow 4GK (CI 68405), as well as anthraquinone type and polycyclic soluble vat dyes and other vat dyes. As magenta dyes, there are azo dyes (Sumilight Supra Rubinol B (CI 29225), Benzo Brilliant Gelanine B (CI 15080)), indigoid dyes (e.g., Indigosol Brilliant Pink IR (CI 73361), Indigosol Violet 15R (CI 59321), Indigosol Red Violet IRRRL (CI 59316), Indanthrene Red Violet RRK (CI 67895), Mikethren Brilliant Violet BBK (CI 6335)), as well as soluble vat dyes of benzoquinone or anthraquinone type hetero-polycyclic compounds and other vat dyes. As cyan dyes, there are azo dyes (e.g., Direct Sky Blue 6B (CI 24410), Direct Brilliant Blue 2B (CI 22610), Sumilight Supra Blue G (CI 34200)), phthalocyanine dyes (e.g., Sumilight Supra Turquoise Blue G (CI 74180), Mikethren Brilliant Blue 4G (CI 74140)), as well as Indanthrene Turquoise Blue 5G (CI 69845), Indanthrene Blue GCD (CI 73066), Indigosol 04G (CI 73046) and Anthrasol Green IB (CI 59826).

As mentioned above, the metal complexes of the present invention have the function of stabilizing base substances. These compounds may be incorporated into any individual emulsion layer of color photographic films or into the whole of the films. These compounds may also be incorporated into anyone of the non-light-sensitive layer parts of color reversal photographic materials.

These complexes may be dissolved in a low boiling point organic solvent or a water-miscible organic solvent which does not have a bad influence on photographic properties of photographic materials, for example, alcohols (e.g., methanol, ethanol, isopropanol, butanol), ethers (e.g., dimethyl ether, methylethyl ether, diethyl ether, 1-ethoxypropane), glycols (e.g., 1,2-ethanediol, 1,2-propanediol, 1,3-propanediol), ketones (e.g., acetone, ethyl methyl ketone, 3-pentanone), esters (e.g., ethyl formate, methyl acetate, ethyl acetate), or amides (e.g., formaide, acetamide succinic acid amide), and the resulting solution may be added to a hydrophilic colloid for constituting a photographic layer to thereby stabilize the intended base substance in the photographic material. The addition of the complex-containing solution to the hydrophilic colloid is desirably carried out prior to coating, for example, in the step of preparing the silver halide photographic emulsion, the step of dispersing the coupler by emulsification or the step of preparing the photographic coating composition.

For introduction of the complex into the hydrophilic colloid constituting a photographic layer, the same method as that for dispersion of the coupler into the colloid may be employed. For instance, U.S. Pat. Nos. 2,304,939 and 2,322,027 illustrate the use of high boiling point organic solvents for dissolving the complex materials. Other methods which may apply to the present invention are described in U.S. Pat. Nos. 2,801,170, 2,801,171 and 2,949,360, where a low boiling point or water-soluble organic solvent is used together with a high boiling point solvent High boiling point solvents which are effective for dispersion of the base compounds and metal complexes of the present invention include di-n-butyl phthalate, benzyl phthalate, triphenyl phosphate, tri-o-cresyl phosphate, diphenyl mono-p-tert-butylphenyl phosphate, monophenyl di-p-tert-butylphenyl phosphate, diphenyl mono-o-chlorophenyl phosphate, monophenl di-o-chlorophenyl phosphate, 2,4-di-n-amylphenol, 2,4-di-t-amylphenol, N,N-diethyllaurylamide, as well as trioctyl phosphate and trihexyl phosphate described in U.S. Pat. No. 2,676,137.

Examples of low boiling point or water-soluble organic solvents which may advantageously be used together with the high boiling point solvents are described in U.S. Pat. Nos. 2,801,170, 2,801,171 and 2,949,360.

These organic solvents include:

(1) substantially water-insoluble low boiling point solvents, such as methyl, ethyl, propyl or butyl acetate, isopropyl acetate, ethyl propionate, secbutyl alcohol, ethyl formate, butyl formate, nitromethane, nitroethane, carbon tetrachloride and chloroform, and, (2) water-soluble organic solvents, such as methyl isobutyl ketone, 8-ethoxyethyl acetate, 8-butoxytetrahydrofurfuryl adipate, diethylene glycol monoacetate, methoxytriglycol acetate, acetonyl-acetone, diacetone alcohol, ethylene glycol, diethylene glycol, dipropylene glycol, acetone, methanol, ethanol, acetonitrile, dimethylformamide and dioxane.

Both the base substance and the complex may be present in any one or any two or more of the hydrophilic, colloid layers in a photographic element. These substances may be present in light-sensitive elements and/or may be present in non-light-sensitive elements such as color image-receiving elements to be used in photographic diffusion transfer film units. When the base substance and complex are incorporated into such non-light-sensitive image-recording element, the base substance is preferably mordanted. Accordingly, in this case, it is preferred that the complex is in the form of a molecular state that will remain in the mordant layer of the image-receiving element so that the complex may not diffuse out of the dye (base substance) to be stabilized with the complex.

The method of the present invention is used for improving the light-fastness of photographic elements such as image transfer film units, including types as below stated. One is the inhibition transfer film unit described in U.S. Pat. No. 2,882,156. The other is the color image transfer film unit described in U.S. Pat. Nos. 2,087,817, 3,185,567, 2,983,606, 3,253,915, 3,227,550, 3,227,551, 3,227,552, 3,415,644, 3,415,645, 3,415,646, 3,594,164 and 3,594,165 and Belgian Pat. Nos. 757,959 and 757,960.

The complexes and base substances for use in the present invention can be used together with the materials described in *Product Licensing Index*, Vol. 92, No. 9232 (December, 1971), pages 107 to 110, in accordance with the process described therein.

The complexes of the present invention can provide the improvement of the invention when used in nearly any amount, and theoretically there is no upper limit of the amount of the complex to be used. Preferably, the complex is present in a photographic material in an amount of at least 1 micromol per $m^2$ of the material, more preferably in an amount of from about 10 to $1\times10^4$ micromol per $m^2$ of the material.

In general, the concentration of the base substance to be treated in accordance with the present invention is to be same as that generally used in color photography. The concentration is well known by one skilled in the color photographic art. It is preferred that the base substance is present in a photographic material in an amount of from about 10 to $10^4$ micromols per $m^2$ of the material. More preferably, it is present in an amount of from about 100 micromols to about $3\times10^3$ micromols per $m^2$ of the material.

The base substance to be used in the present invention generally has a smaller maximum wavelength absorption peak than about 800 nm. It is preferred that the base substance has a maximum wavelength absorption peak within the range of from about 300 nm to about 800 nm, more preferably from about 400 nm to about 800 nm.

For the photographic materials to be treated by the method of the present invention, any and every support which is generally used in conventional photographic materials can be used. For examples, usable supports include cellulose nitrate film, cellulose acetate film, cellulose acetate butyrate film, cellulose acetate propionate film, polystyrene film, polyethylene terephthalate film, polycarbonate film as well as laminates thereof and paper. In particular, paper supports as coated or laminated with baryta or α-olefin polymer, especially u-olefin polymer having from 2 to 10 carbon atoms such as polyethylene or polypropylene, as well as plastic film supports whose surfaces have been coarsened by the method described in JP-B-47-19068 so as to improve the surface adhesiveness with other polymer substances are preferred for use in the present invention.

Various kinds of hydrophilic colloids are used in the photographic materials to be treated by the method of the present invention. As hydrophilic colloids to be used as the binder for photographic emulsions and/or other photographic constituting layers, there may be mentioned, for example, gelatin, colloidal albumin, casein, cellulose derivatives such as carboxymethyl cellulose and hydroxyethyl cellulose, saccharide derivatives such as agar, sodium alginate and starch derivatives, as well as synthetic hydrophilic colloids such as polyvinyl alcohol, poly-N-vinylpyrrolidone, polyacrylic acid copolymer, maleic anhydride copolymer, polyacrylamide and derivatives and partially hydrolyzed products thereof. If desired, a compatible mixture of two or more of these colloids can be used.

Most generally used among them is gelatin. A part or all of the gelatin may be substituted by a synthetic polymer substance. In addition, so-called gelatin derivatives, for example, those obtained by treating and modifying a functional group in the molecule, such as amino group, imino group, hydroxyl group or carboxyl group therein, with a reagent having at least one group capable of reacting with the functional group, or graft polymers obtained by bonding molecular chains of other polymer substance to gelatin molecules, may also be used in the present invention.

The photographic materials to be treated by the method of the present invention may contain, in the photographic emulsion layers and other layers, a synthetic polymer compound, for example, a water-dispersed vinyl compound polymer in the form of a latex, especially a compound capable of increasing the dimensional stability of the material, singly or in combination with polymer(s) of other kinds, or a combination of the synthetic polymer compound with a hydrophilic water-permeable colloid.

The silver halide photographic emulsions of the photographic materials to be treated by the method of the present invention can be prepared generally by blending a water-soluble silver salt (e.g., silver nitrate) and a water-soluble halide (e.g., potassium bromide) in the presence of a water-soluble high molecular substance (e.g., gelatin) solution. The silver halide may be silver chloride or silver bromide and may also be a mixed silver halide such as silver chlorobromide, silver iodobromide or silver chloroiodobromide. The silver halide grains can be prepared in a known conventional manner Of course, it is advantageous to use a so-called single or double jet method or controlled double jet method. Two or more kinds of silver halide photographic emulsions as separately prepared may be blended.

The photographic emulsions may contain various compounds so as to prevent a decrease of sensitivity and occurrence of fog during preparation, storage or processing of the photographic materials. As compounds which may be used for the purpose, a great many compounds have heretofore been know which include, for example, 4-hydroxy-6-methyl-1,3,3a,7-tetrazaindene, 3-methylbenzothiazole as well as other various heterocyclic compounds, hydrous silver compounds, mercapto compounds and metal salts.

The silver halide emulsions for use in the present invention can be chemically sensitized in a conventional manner. As chemical sensitizing agents for the purpose, there may be mentioned gold compounds such as chloroaurates and gold trichloride, salts of noble metals such as platinum, palladium, iridium or rhodium sulfur compounds capable of reacting with silver salts to form silver sulfide, such as sodium thiosulfate, as well as stannous salts, amines and other reducing substances.

The photographic emulsions for use in the method of the present invention can be processed for spectral sensitization or super color sensitization, by the use of cyanine dyes (e.g., cyanine, merocyanine or carbocyanine dyes) singly or in combination thereof or in combination of the cyanine dyes with other styryl dyes. The selection of the dyes to be used for the purpose may freely be determined in accordance with the use and object of the photographic material to be processed, for example the wavelength range to be sensitized and the sensitivity of the material.

The hydrophilic colloid layers in the photographic materials to be treated by the method of the present invention may be hardened with various crosslinking agents, if desired. For example, the agent for the purpose may be selected from aldehyde compounds, active halogen compounds, vinylsulfone compounds, carbodiimide compounds, N-methylol compounds and epoxy compounds.

As one embodiment of the method of the present invention, when applied to a color photographic material, the material is imagewise exposed and then processed in a conventional manner to form a color image. In this case, the processing procedure essentially comprises color development, bleaching and fixation, and this optionally has additional rinsing-in-water step and/or stabilization step, if desired. These steps may be combined, if desired, and for example, the bleach-fixation can be carried out in one bath. The color development is generally carried out in an alkaline solution containing an aromatic primary amine developing agent.

As another embodiment of the method of the present invention, when applied to a color photographic material which is a color diffusion transfer film unit, the processing of the material is automatically carried out in the inside of the material. In this case, the developing material is incorporated into a breakable container. As the developing agent which may be used in this embodiment, there are N-methylaminophenol, 1-phenyl-3-pyrazolidone, 1-phenyl-4,4-dimethyl-3-pyrazolidone, 1-phenyl-4-methylhydroxymethyl-3-pyrazolidone and 3-methoxy-N,N-diethyl-p-phenylenediamine, in addition to the above-mentioned aromatic primary amine developing agents.

For formation of color images in the photographic materials to which the method of the present invention is applied, various known processes can be employed, for example, a process of coupling reaction of the abovementioned dye-forming color coupler and the oxidation product of a p-phenylenediamine color developing agent, a process of using a dye developer, a process of oxidative cleavage reaction of a DRR compound, a process of coupling reaction to release a dye, a process of coupling reaction of a DDR coupler for formation of a dye, and a process of silver dye bleaching.

Accordingly, when the method of the present invention is to be applied to photographic materials, it may be applied to various color photographic materials including color positive films, color papers, color negative films, color reversal films, color diffusion reversal film units and materials for silver dye bleaching. In addition, the method of the present invention may also be applied for stabilization to light in an optical recording system. For instance, the organic base substances to be stabilized by the method of the present invention include any and all dyes which are used in high density optical recording, for example, as recording media of optical discs, and examples of such dyes include methine dyes such as cyanine dyes as well as naphthoquinone dyes, indoaniline dyes and azulene dyes. Specific examples of these dyes are mentioned below, which, however, are not intended to restrict the scope of the present invention.

(IX-1)
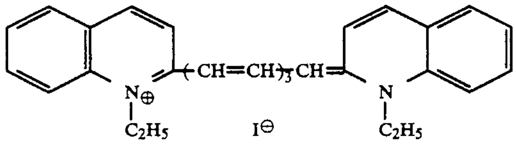
(IX-2)
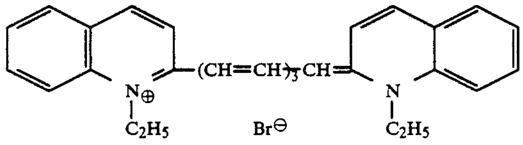
(IX-3)
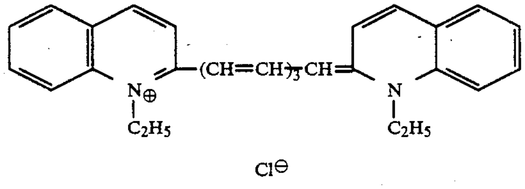
(IX-4)
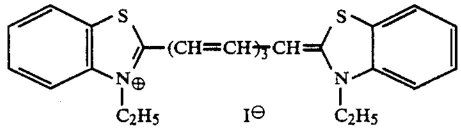
(IX-5)
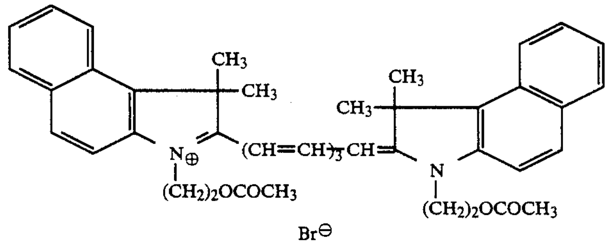
(IX-6)
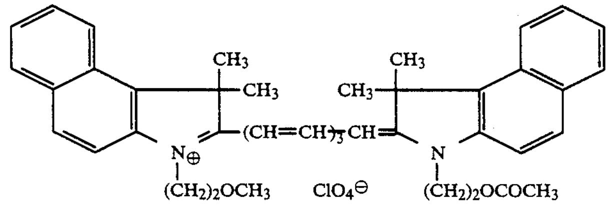
(IX-7)
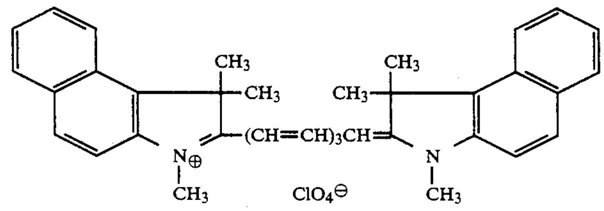

-continued

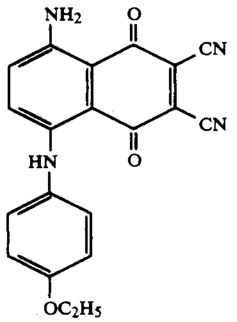

(IX-8)

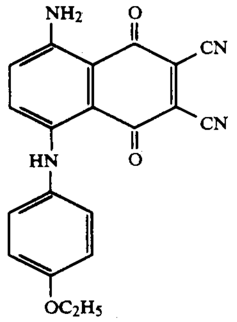

(IX-9)

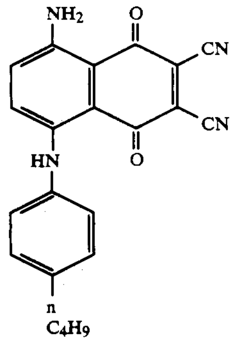

(IX-10)

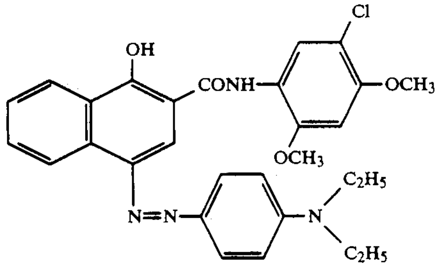

(IX-11)

As mentioned above in detail, the metal complexes for use in the present invention have a function of stabilizing organic base substances.

The stabilizing effect can be attained only when both the metal complex and the organic base substance are uniformly dispersed in a pertinent medium or a binder.

As examples of such media or binder, there are organic solvents and polymer materials such as plastics As organic solvents, the same as those to be used for dispersing the complex in a photographic layer, which are mentioned above, may generally be used. As plastics to be used for the purpose, the following examples may be mentioned.

For example, there are polyesters such as polyethylene terephthalate, cellulose esters such as cellulose diacetate, cellulose triacetate and cellulose acetate butyrate, polyolefins such as polyethylene and polypropylene, polyvinyl compounds such as polyvinyl chloride, polyvinylidene chloride, vinyl chloride/vinyl acetate copolymer and polystyrene, acrylic addition polymers such as polymethyl methacrylate, polycarbonates, phenol resins, urethane resins, as well as hydrophilic binders such as gelatin. As more preferred media, there may be mentioned the following substances:

(i) Polyolefins:

Polyethylene, polypropylene, poly-4-methylpentene 1.

(ii) Polyolefin Copolymers:

Ethylene/vinyl acetate copolymer, ethylene/acrylate copolymer, ethylene/acrylic acid copolymer, ethylene/maleic acid copolymer, ethylene/propylene terpolymer (EPT).

In these copolymers, the polymerization ratio of the respective comonomers may vary as in the art.

(iii) Vinyl Chloride Copolymers:

Vinyl acetate/vinyl chloride copolymer, vinyl chloride/vinylidene chloride copolymer, vinyl chloride/-maleic anhydride copolymer, copolymer of acrylate or methacrylate and vinyl chloride, acrylonitrile/vinyl chloride copolymer, vinyl chloride/vinyl ether copolymer, ethylene or propylene/vinyl chloride copolymer, vinyl chloride grafted ethylene/vinyl acetate copolymer.

In these copolymers, the polymerization ratio of the respective comonomers may vary as in the art.

(iv) Vinylidene Chloride Copolymers:

Vinylidene chloride/vinyl chloride copolymer, vinylidene chloride/vinyl chloride/acrylonitrile copolymer, vinylidene chloride/butadiene/halogenated vinyl copolymer.

In these copolymers, the copolymerization ratio may vary as in the art.

(v) Polystyrene.

(vi) Styrene Copolymers:

Styrene/acrylonitrile copolymer (AS resin), styrene/acrylonitrile/butadiene copolymer (ABS resin), styrene/maleic anhydride copolymer (SMA resin), styrene/acrylate acrylamide copolymer, styrene/butadiene copolymer (SBR), styrene/vinylidene chloride copolymer, styrene/methyl methacrylate copolymer.

In these copolymers, the copolymerization ratio of the respective comonomers may vary as in the art.

(vii) Styrene Copolymers:

Copolymers of α-methylstyrene, p-methylstyrene 2,5-dichlorostyrene, αβ-vinylnaphthalene, α-vinylpyridine, acenaphthene and vinylanthracene, such as α-methylstyrene/methacrylate copolymer.

(viii) Coumarone-indene resins: Coumarone/indene/styrene copolymer.

(ix) Terpene Resin and Piccolyte:

Terpene resin of limonene copolymer obtained from α-pinene, and Piccolyte obtained from 3-pinene.

(x) Acrylic Resins:

Acrylic resins having an atomic group of the following formula are especially preferred:

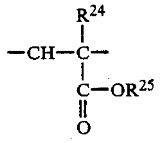

in which $R^{24}$ represents a hydrogen atom or an alkyl group; $R^{25}$ represents a substituted or unsubstituted alkyl group. In the formula, $R^{24}$ is preferably a hydrogen atom or a lower alkyl group having from 1 to 4 carbon atoms, more preferably a hydrogen atom or a methyl group.

$R^{24}$ is an alkyl group which may be either substituted or unsubstituted, and the alkyl group preferably has from 1 to 8 carbon atoms. When $R^{24}$ is a substituted alkyl group, the substituent for the group is preferably a hydroxyl group, a halogen atom or an amino group (especially a dialkylamino group).

The atomic group having the formula may form a copolymer together with other repeating atomic groups to constitute various kinds of acrylic resins, but in general, one or more repeating units of the abovementioned atomic group form homopolymers or copolymers to constitute acrylic resins.

(xi) Polyacrylonitrile.

(xii) Acrylonitrile Copolymers:

Acrylonitrile/vinyl acetate copolymer, acrylonitrile/vinyl chloride copolymer, acrylonitrile/styrene copolymer, acrylonitrile/vinylidene copolymer, acrylonitrile/vinylpyridine copolymer, acrylonitrile/-methyl methacrylate copolymer, acrylonitrile/butadiene copolymer, acrylonitrile/butyl acrylate copolymer.

In these copolymers, the copolymerization ratio of the respective comonomers may vary as in the art.

(xiii) Diacetoneacrylamide polymer:

Diacetoneacrylamide polymer obtained by reacting acrylonitrile and acetone.

(xiv) Polyvinyl Acetate.

(xv) Vinyl Acetate Copolymers:

Copolymers of acrylate, vinyl ether, ethylene and vinyl chloride. The copolymerization ratio may vary as in the art.

(xvi) Polyvinyl Ethers:

Polyvinyl methylether, polyvinyl ethylether, polyvinyl butylether.

(xvii) Polyamides:

polyamides may be conventional homonylons such as nylon 6, nylon 6-6, nylon 6-10, nylon 6-12, nylon 9, nylon 11, nylon 12 and nylon 13, as well as polymers of nylon 6/6-6/6-10, nylon 6/6-6/12 and nylon 6/6-6/11, and may also be modified nylons.

(xviii) Polyesters:

Preferred are condensation products or copolycondensation products of (a) a dibasic acid, for example an aliphatic dibasic acid such as oxalic aid, succinic acid, maleic acid, adipic acid or sebacic acid, or an aromatic dibasic acid such as isophthalic acid or terephthalic aid, and (b) a glycol such as ethylene glycol, tetramethylene glycol or hexamethylene glycol.

Especially preferred among them are condensation products of an aliphatic dibasic acid and a glycol and copolycondensation products of glycols and aliphatic dibasic acids.

In addition, modified glyptal resins obtained by esterifying modification of a glyptal resin, which is a condensation product of phthalic anhydride and glycerin, with a fatty acid or a natural resin can also be used, preferably.

(xix) Polyvinyl Acetal Resins:

Polyvinyl formal and polyvinyl acetal resins obtained by acetalization of polyvinyl alcohol are preferably used.

The acetalization degree of the polyvinyl acetal resins may vary as in the art.

(xx) Polyurethane Resins:

Thermoplastic polyurethane resins having a urethane bond are typical Especially, polyurethane resins obtained by condensation of glycols and diisocyanates, particularly those obtained by condensation of alkylene glycol and alkylenediisocyanate are preferred.

(xxi) Polyethers:

Styrene-formalin resin, ring-opened polymer of cyclic acetal, polyethylene oxide/glycol copolymer, polypropylene oxide/glycol copolymer, propylene oxide/ethylene oxide copolymer, polyphenylene oxide (xxii) Cellulose Derivatives:

There are various esters or ethers of cellulose, such as nitrocellulose, acetyl cellulose, ethyl cellulose, acetyl-butyl cellulose, hydroxyethyl cellulose, hydroxypropyl cellulose, methyl cellulose and ethylhydroxyethyl cellulose, as well as derivatives thereof.

(xxiii) Polycarbonates:

There are various kinds of polycarbonates such as polydicxydiphenylmethane carbonate and dioxydiphenylpropane carbonate.

(xxiv) Ionomers:

Salts of Na, Li, Zn or Mg of methacrylic acid or acrylic acid.

(xxv) Ketone Resins:

Condensation products of a cyclic ketone (such as cyclohexanone or acetophenone) and formaldehyde.

(xxvi) Xylene Resins:

Condensation products of m-xylene or mesitylene and formalin, or modified derivatives thereof.

(xxvii) Petroleum Resins:

$C_5$ type, $C_9$ type, $C_5$–$C_9$ copolymer type, dicyclopentadiene type petroleum resins, as well as copolymers or modified derivatives thereof.

(xxviii) Blends of two or more of (i) to (xxvii) or blends of (i) to (xxvii) with other thermoplastic resins.

The metal complexes of the present invention provide the improvement of the invention used in essentially any amount, and if used in an excess amount, do not injure the base products except that they could give an undesirable color thereto. Accordingly, theoretically there is no upper limit for the amount of the metal complexes used in accordance with the method of the present invention.

When plastics are to be used as a medium, the complex amount is preferably at least 0.1 mol% or more, especially preferably 1 mol% or more, to the organic base substance to be stabilized.

In accordance with the method of the present invention, addition of an ultraviolet absorber is effective so as to further improve the light-fastness of the organic base substances to be stabilized. For this purpose, there can be used, for example, substituted or unsubstituted benzoates such as resorcin monobenzoate or methyl salicylate, cinnamates such as 2-hydroxy-3-methoxycinnamate, benzophenones such as 2,4-dihydroxybenzophenone, $\alpha,\beta$-unsaturated ketones such as dibenzalacetone, coumarins such as 5,7-dihydroxy-coumarin, carbostyryls such as 1,4-dimethyl-7-hydroxycarbostyryl, and azoles such as 2-phenylbenzimidazole or 2-(2-hydroxyphenyl)-benzotriazole.

In accordance with the present invention, organic base substances, for example organic dyes or polymer substances, which would be faded, discolored or deteriorated by the action of light, can be improved with respect to their light-fastness (light-stability). In addition, in accordance with the present invention, their light-fastness of organic base substances, especially colors or dyes, can be improved without adversely affecting the hue and purity of these substances.

Furthermore, in accordance with the present invention, the substituents of the metal complexes to be used for stabilization of organic base substances may properly be selected and combined so that the solubility of the complexes in solvents may appropriately be controlled and additionally the miscibility thereof with organic base materials may be elevated, and therefore, various binders of a broad range can be used therewith.

Moreover, the method of the present invention can also be applied to light-stabilization of optical discs which may be written with semiconductor lasers.

The following examples are intended to illustrate the present invention but not to limit it in any way. Unless otherwise specifically indicated, all "parts" mentioned hereinafter mean "parts by weight".

In Production Examples 1 to 3, the compounds to be used in the following working examples were prepared. The starting materials of bis(α-diimine)nickel halides and (α-diimine)(dihalo)nickel complexes were prepared in accordance with the descriptions of *Z. Anorg, Alg. Chemie*, 267, 137 (1951), and ibid., 267, 161 (1951). Accordingly, the starting materials are referred to merely as (α-diimine)(dihalo)nickel, and the preparation thereof is not shown.

PRODUCTION EXAMPLE 1:

Production of aforesaid Compound No. (2):

0.002 mol of 4,5-dimethyl-1,3-dithiol-2-one was dispersed in 30 ml of anhydrous methanol. To this was added 0.004 mol of sodium methoxide (this may be in the form of a methanol solution), and the whole was stirred for 2 hours at room temperature. 0.002 mol of (α-diimine)(dichloro)nickel was added to the resulting solution and stirred for one further hour at room temperature.

The precipitate which crystallized out was filtered, washed with methanol and air-dried.

The thus obtained solid was dissolved in a small amount of dichloromethane and subjected to column chromatography with silica gel (Merck Art 7734 Kieselgel 60, 70 to 230 mesh) for purification. Yield: 0.2 g.

PRODUCTION EXAMPLE 2:

Production of aforesaid Compound No. (21):

0.002 mol of 4,5-diphenyl-1,3-dithiol-2-one was dispersed in 30 ml of anhydrous methanol. To this was added 0.004 mol of sodium methoxide (this may be in the form of a methanol solution), and the whole was stirred for 2 hours at room temperature. 0.002 mol of (α-di-imine)(dichloro)nickel was added to the resulting solution and stirred for one further hour at room temperature.

The precipitate which crystallized out was filtered, washed with methanol and air-dried.

The thus obtained solid was dissolved in small amount of dichloromethane and subjected to column chromatography with silica gel (Merck Art 7734 Kieselgel 60, 70 to 230 mesh) for purification. Yield: 0.3 g.

PRODUCTION EXAMPLE 3:

Production of aforesaid Compound No. (115):

0.002 mol of (u-diimine)(dibromo)nickel was dissolved in 30 ml of anhydrous methanol. To this was added 0.002 mol of sodium 1,2-dicyanoethylenedithiolate and the whole was stirred for 2 hours at room temperature.

The crystal which precipitated out was filtered, washed with methanol and then air-dried.

This was dissolved in a small amount of dichloromethane and then purified by column chromatography with silica gel (Merck Art 7734 Kieselgel 60, 70 to 230 mesh). Yield: 0.1 g.

EXAMPLE 1

0.2% (by weight) of the compound (2) prepared in Production Example 1 was added to polypropylene powder and pressed at 190° C. for one minute to form a film (200 μm thick). This was exposed with a xenon weathermeter (Atlas Weather-0-Meter; xenon 6.5 KW, illuminance 100,000 luxes) under the conditions of panel temperature of 60° C. and relative humidity of 50%, whereupon the carbonyl index was measured in accordance with the time of exposure so as to determine the deterioration of the polypropylene. For control, polypropylene powder to which the compound (2) had not been added was also tested in the same manner. The results were shown in FIG. 1.

The carbonyl index as referred to herein indicates the amount of carbonyl group as formed in proportion to the deterioration of polypropylene by light. For measurement of the carbonyl index, the carbonyl group as formed in proportion to the deterioration of the polypropylene by irradiation of light thereto was traced by means of the infrared spectrum of the sample, and the absorbance at 1710 cm-1 was divided by the thickness (in microns) of the sample to obtain the intended carbonyl index.

As is obvious from FIG. 1, the compound (2) had an effect of preventing the deterioration by light of polypropylene.

EXAMPLE 2

0.1 g of 1-(2,4,6-trichlorophenyl)-3-(2-chlor-5-tetradecanamido)amilino-4-{4-(N-ethyl-N-β-methanesulfonamidoethyl)aminophenyliminoi}-5-oxo-2-pyraozline was dissolved in the mixture of 3 ml of tricresyl phosphate and 5 ml of ethyl acetate, and the resulting solution was dispersed by emulsification in 10 g of a 10% gelatin solution containing 1 ml of an aqueous 1% sodium dodecylbenzenesulfonate solution. Next, the resulting emulsified dispersion was blended with 10 g of 10% gelatin and then coated on a paper support, both surfaces of which had been coated with polyethylene, and dried. The thus prepared sample was called Sample (A).

In the same manner as above, except that 30 mg of the aforesaid Compound No. (21) of the invention was added in preparation of the emulsified dispersion, Sample (B) was prepared. Also in the same manner as the preparation of Sample (A), except that 15 mg or 150 mg of a known antidiscoloring agent 2,5-di-tert-octylhydroquinone was added in preparation of the emulsified dispersion, Sample (C) or Sample (D) was prepared. The amount of the dye coated was 60 mg/m$^2$ in every sample. Each of these Samples (A) to (D) was subjected to a discoloration test for 48 hours by the use of a xenon tester (illuminance, 200,000 luxes) with Ultraviolet-Cut Filter C-40 (manufactured by Fuji Photo Film Co.). The results obtained were shown in Table 2 below.

TABLE 2

| | Initial Density | Density After Test |
|---|---|---|
| Sample A | 0.82 | 0.12 |
| Sample B | 0.81 | 0.81 |
| Sample C | 0.81 | 0.23 |
| Sample D | 0.79 | 0.41 |

The density of each sample was measured by the use of Macbeth Densitometer RD 514 Type with a green filter of Status AA Filter. As is obvious from the results in Table 2, the Sample (B) containing the compound No. (21) of the invention was extremely stable to light, as opposed to the other Samples (A), (C) and (D), and did not discolor at all after the test. In particular, it was noted that the known stabilizer di-tert-octylhydroquinone was almost ineffective in the Samples (C) and (D), although this was added to them in an equimolar amount or 10 times higher than the amount of the compound No. (21) of the invention, respectively. It is apparent that the compound No. (21) of the invention has a surprisingly high antidiscoloration potency to dyes.

EXAMPLE 3

0.1 g of Compound (IX-2) was dissolved in 0.2 ml of 1 N-NaOH and 2 ml of methanol, and the resulting solution was added to 10 g of 10% gelatin. This was coated on a paper support both surfaces of which had been coated with polyethylene, in an amount of 80 mg/m$^2$ as the Compound (IX-2). The thus prepared sample was called Sample (E).

In the same manner as above, except that a solution prepared by dissolving 40 mg of the Compound No. (21) of the invention into 2 ml of methanol was added to the coating composition immediately before coating, Sample (F) was prepared. Also in the same manner as the preparation of Sample (E), except 20 mg of a known antidiscoloring agent 2,5-di-tert-octylhydroquinone was added to the coating composition immediately before coating, Sample (G) was prepared for comparison. Each of these samples was subjected to a discoloration test for 12 hours using the ultraviolet absorbing filter in the same manner as in Example 2. The results obtained were shown in Table 3 below.

TABLE 3

| | Initial Density | Density After Test |
|---|---|---|
| Sample E | 0.90 | 0.11 |
| Sample F | 0.90 | 0.78 |
| Sample G | 0.90 | 0.29 |

The density was measured in the same manner as in Example 2, using the same Macbeth Densitometer. From the results of the experiment, it is understood that the Compound No. (21) of the invention has an extremely high antidiscoloring activity.

EXAMPLE 4

10 g of magenta coupler 1-(2,4,6-trichlorophenyl)3-{(2-chlorα-5-tetradecanamido)anilino}-2 -one was dissolved in the mixture of 30 ml of tricresyl phosphate, 5 ml of dimethylformamide and 15 ml of ethyl acetate, and the resulting solution was dispersed by emulsification in 80 g of a 10% gelatin solution containing 8 ml of an aqueous 1% sodium dodecylbenezenesulfonate solution.

Next, the resulting emulsified dispersion was blended with 145 g of a silver chlorobromide emulsion (Br 50 mol%), (Ag-content 7 g), and sodium dodecylbenzenesulfonate (coating aid) was added thereto The resulting emulsion was coated on a paper support, both surfaces of which had been coated with polyethylene The thus prepared sample was called Sample (H). The amount of coupler coated was 400 mg/m$^2$.

In the same manner as above, except that 2.5 g of the Compound No. (115) of the invention was added in preparation of the emulsified dispersion, Sample (I) was prepared. Also in the same manner as the preparation of Sample (H), except that 1.0 g of a known antidiscoloring agent 2,5 di-tert-octylhydroquinone was added in the preparation of the emulsified dispersion, Sample (J) was prepared. Each of these samples was exposed with a light of 1,000 luxes for one second and then processed with the following processing solutions.

| | | |
|---|---|---|
| Developer: | | |
| Benzyl Alcohol | | 15 ml |
| Diethylenetriamine-pentaacetic Acid | | 5 g |
| KBr | | 0.4 g |
| $Na_2SO_3$ | | 5 g |
| $Na_2CO_3$ | | 30 g |
| Hydroxylamine Sulfate | | 2 g |
| 4-Amino-3-methyl-N-β-(methanesulfonamido)ethyl-aniline.3/2 $H_2SO_4.H_2O$ | | 4.5 g |
| Water to make | | 1000 ml |
| | | pH 10.1 |
| Bleach-Fixing Solution: | | |
| Ammonium Thiosulfate (70 wt. %) | | 150 ml |
| $Na_2SO_3$ | | 5 g |
| Na[Fe(EDTA)] | | 40 g |
| EDTA | | 4 g |
| Water to make | | 1000 ml |
| | | pH 6.8 |
| Processing Steps: | Temperature | Time |
| Developing | 33° C. | 3 min 30 sec |
| Bleach-Fixation | 33° C. | 1 min 30 sec |
| Rinsing in Water | 28 to 35° C. | 3 min |

Each sample having the thus formed color image was exposed to a sunlight through Ultraviolet Absorption Filter C-40 (manufactured by Fuji Photo Film co.) which cut rays of 400 nm or less, for 2 weeks. The results obtained after the test were shown in Table 4 below. The density was measured by the use of Macbeth Densitometer RD-154 Type (with Status AA Filter), and the change in the density at the part having an initial density of 2.0 was measured.

TABLE 4

| | Density at the Part Having Initial Density of 2.0, After Test | Color Retention |
|---|---|---|
| Sample H | 0.52 | 26% |
| Sample I | 1.76 | 91% |
| Sample J | 1.34 | 67% |

From the results, it is understood that the Compound No. (115) of the invention is an effective antifading agent.

EXAMPLE 5

Various kinds of base dyes each in the form of a dimethylformamide solution (20 ml) were subjected to an antidiscoloration test in the presence of a metal complex of various type. In preparing the test solution, $2\times10^{-4}$ mol of the base dye and $6\times10^{-4}$ mol of the metal complex were dissolved before irradiation of light.

The exposure was conducted by the use of a xenon lamp (200,000 luxes) with a UV-cut filter. The exposure time was 200 hours. The results obtained were shown in Table 5 below.

TABLE 5

| Example No. | Base Dye | Metal complex | Color Retention | Blank (%)(*) |
|---|---|---|---|---|
| 1 | IX-1 | (21) | 78 | 0 |
| 2 | IX-2 | (21) | 70 | 0 |
| 3 | IX-3 | (115) | 75 | 0 |
| 4 | IX-4 | (115) | 66 | 0 |
| 5 | IX-7 | (115) | 77 | 0 |

TABLE 5-continued

| Example No. | Base Dye | Metal complex | Color Retention | Blank (%)(*) |
|---|---|---|---|---|
| 6 | IX-8 | (115) | 82 | 68 |

(*)This means color retention (%) obtained by exposure in the absence of metl complex.

EXAMPLE 6

The aforesaid Compound No. (21) or (115) of the invention was used, and the compositions comprising the following components were blended and well stirred and then filtered. Each resulting composition was coated on a metal support by spreading to form a film thereon and then peeled off to isolate the thus formed film (thickness, 25 μm) therefrom.

This film was exposed to a xenon lamp (200,000 luxes) for 5 hours, and the dye retention was examined. The results obtained were shown in Table 6 below.

| Composition: | |
|---|---|
| TAC (Triacetyl Cellulose) | 170 parts |
| TPP (Triphenyl Phosphate) | 10 parts |
| Methylene Chloride | 800 parts |
| Methanol | 160 parts |
| Compound (21) or (115) | 2 parts |
| Base Dye | 1 part |

TABLE 6

| Example No. | Base Dye | Metal Complex | Dye Retention | Blank (%)(*) |
|---|---|---|---|---|
| 1 | IX-1 | (21) | 86 | 36 |
| 2 | IX-2 | (21) | 74 | 38 |
| 3 | IX-3 | (115) | 73 | 41 |
| 4 | IX-4 | (115) | 70 | 40 |
| 5 | IX-7 | (115) | 73 | 35 |
| 6 | IX-8 | (115) | 91 | 92 |

(*)This means color retention (%) obtained by exposure in the absence of metl complex.

While the invention has been described in detail and with reference to the specific embodiments thereof, it will be apparent to one skilled in the art that various changes and modifications can be made therein without departing from the spirit and scope thereof.

What is claimed is:

1. A method of stabilizing an organic base substance, which has an absorption maximum in the range of about 300 nm to about 2,000 nm, against light, which comprises combining said organic substance which is selected from the group consisting of a water-soluble dye and an insoluble dye and at least one complex of the following formulae(I), (II) or (III):

(I)

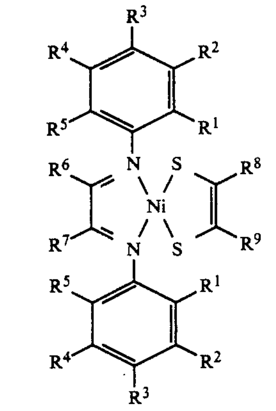

(I)

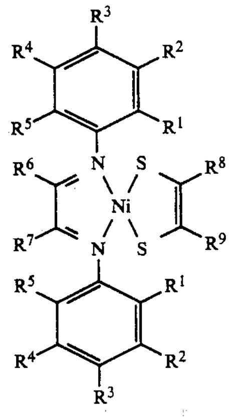

(II)

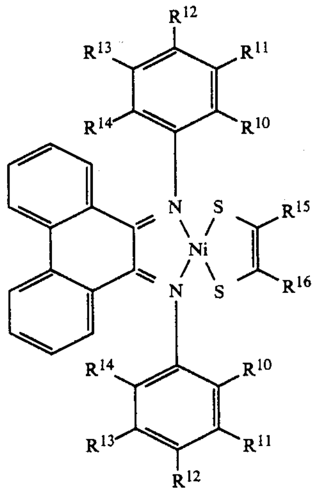

-continued (III)

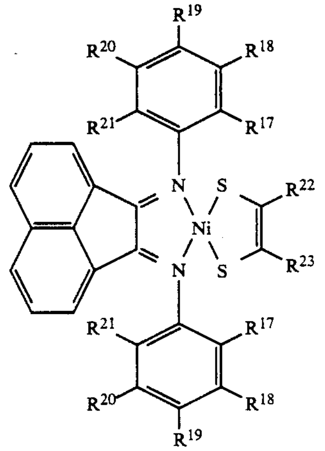

in which each of $R^1$ to $R^5$, each of $R^{10}$ and $R^{14}$ and each of $R^{17}$ to $R^{21}$, each of which may be the same or different within an individual compound, represents a halogen atom, a hydrogen atom, or an alkyl, aryl, cocloalkyl or heterocyclic group which is bonded to the carbon atom on the benzene right directly or indirectly via a divalent linking group, and adjacent substituents of $R^1$ to $R^5$, $R^{10}$ to $R^{14}$, and $R^{17}$ to $R^{21}$ may be bonded together to form a ring;

$R^6$ and $R^7$ each represents an alkyl group or an aryl group, and these may be the same or different;

$R^8$, $R^9$, $R^{15}$, $R^{16}$, $R^{22}$ and $R^{23}$ each represents a hydrogen atom, an alkyl group, an aryl group or a cyano group, and these may be the same or different within an individual compound; and $R^8$ and $R^9$, $R^{15}$ and $R^{16}$, and $R^{22}$ and $R^{23}$ may be bonded together to form a ring.

2. The method as in claim 1, wherein the dye is a quinoneimine dye, a methine or polymethine dye, an azo dye, an anthraquinone dye, an indoamine or indophenol dye, an indigoid dye, a carbonium dye, a formazane dye or a pyrazolazole dye.

3. The method as in claim 1, wherein the organic base substance to be stabilized in a polymer is selected from the group consisting of polyolefins, polyamides, polydienes, polyvinyl chlorides, polyacrylic acids, polystyrenes, polyvinyl alcohols, polyesters, polyethers, polyurethanes, polyacetals, polycarbonates and polyphenylene oxides.

4. The method as in claim 3, wherein the polymer is selected from the group consisting of polyolefins, polydienes and polystyrenes.

5. The method as in claim 1, wherein the organic base substance to be stabilized is an image-forming dye for use in a photographic field.

6. The method as in claim 5, wherein the image-forming dye is derived from color couplers, DRR compounds, DRR couplers, amidorazone compounds, dye couplers or dyes for silver dye-bleaching process.

7. The method as in claim 6, wherein the color couplers are yellow, magenta or cyan dye-forming couplers.

8. The method as in claim 7, wherein the couplers are selected from the group consisting of compounds of the following formulae (IV), (V), (VI) and (VII):

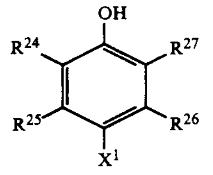

(IV)

in which $R^{24}$, $R^{25}$, $R^{26}$ and $R^{27}$ each represents a hydrogen atom, a halogen atom, an alkyl group, a carbamoyl group, a sulfamoyl group, an amido group, a sulfonamido group, a phosphoric acid amido group or an ureido group;

$R^{24}$ and $R^{26}$ may be bonded together to form a 6-membered ring;

$X^1$ represents a hydrogen atom, a halogen atom or a group capable of being released by reaction with an oxidation product of a developing agent;

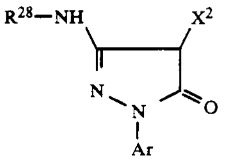

(V)

in which $R^{28}$ represents an alkyl group, an aryl group, an acyl group or a carbamoyl group;

Ar represents an unsubstituted phenyl group or a phenyl group substituted by one or more substituents selected from a halogen atom, an alkyl group, a cyano group, an alkoxy group, an alkoxycarbonyl group and an acylamino group; $X^2$ represents a hydrogen atom or a group capable of being released by reaction with the oxidation product of an aromatic primary amine color developing agent;

the formula may form a dimer or a higher polymer at the position of Rzs, Ar or Xz;

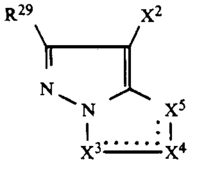

(VI)

in which $R^{29}$ represents a hydrogen atom or a substituent; $X^2$ represents a hydrogen atom or a group capable of being released by reaction with the oxidation product of an aromatic primary amine color developing agent;

$X^3$, $X^4$ and $X^5$ each represents

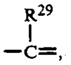

—N=or —NH—, and one of $X^5$—$X^4$ bond and $X^4$—$X^3$ bond is a double bond and the other is a single bond, and when $X^4$—$X^3$ is a carbon-carbon double bond, this may be a part of an aromatic ring; the formula may form a dimer or a higher polymer at the position of $R^{29}$ or $X^2$;

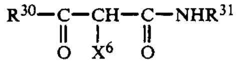

(VII)

in which $R^3$o represents an alkyl group or an aryl group;

$R^{31}$ represents an aryl group;

$X^6$ represents a hydrogen atom, a halogen atom or a group capable of being released by reaction with the oxidation product of a developing agent.

9. The method as in claim 1, wherein the alkyl group for $R^1$ to $R^{23}$ has 1 to 20 carbon atoms.

10. The method as in claim 1, wherein the aryl group for $R^1$ to $R^5$, $R^{10}$ to $R^{14}$ and $R^{17}$ to $R^{21}$ has 6 to 14 carbon atoms.

11. The method as in claim 1, wherein the heterocyclic group or the cycloalkyl group for $R^1$ to $R^5$, to $R^{14}$ and $R^{17}$ to $R^{21}$ is a 5-membered or a 6-membered group.

12. The method as in claim 1, wherein the alkyl group for $R^1$ to $R^5$, $R^{10}$ to $R^{14}$ and $R^{17}$ to $R^{21}$ is selected from the group consisting of methyl, ethyl, propyl, butyl, hexyl, octyl, decyl, dodecyl, tetradecyl, hexadecyl and octadecyl groups.

13. The method as in claim 1, wherein the aryl group for $R^1$ to $R^5$, $R^{10}$ to $R^{14}$ and $R^{17}$ to $R^{21}$ is selected from the group consisting of phenyl and napthyl.

14. The method as in claim 1, wherein the heterocyclic group for $R^1$ to $R^5$, $R^{10}$ to $R^{14}$ and $R^{17}$ to $R^{21}$ is selected from the group consisting of furyl, hedrofuryl, thienyl, pyrrolyl, pyrrolidiyl, pyridyl, imidazolyl, pyrazolyl, quinolyl, indolyl, oxazlyl and thiazolyl.

15. The method as in claim 1, wherein the cycloalkyl group for $R^1$ to $R^5$, $R^{10}$ to $R^{14}$ and $R^{17}$ to $R^{21}$ is selected form the group consisting of cyclopentyl, cyclohexyl, cyclohexenyl, and cyclohexadienyl.

16. The method as in claim 1, wherein the aryl group for $R^6$ to $R^9$, $R^{15}$, $R^{16}$, $R^{22}$ and $R^{23}$ is a substituted or unsubstituted phenyl group.

17. The method as in claim 2, wherein the dye is selected from the group consisting of methine, polymethine, indoamine and indophenol, said dyes having the following group:

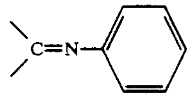

wherein the phenyl group is an unsubstituted phenyl group or a substituted phenyl group.

* * * * *